United States Patent [19]

Levecque, deceased et al.

[11] 4,268,293

[45] May 19, 1981

[54] STABILIZATION OF GLASS FEED IN FIBERIZATION BY TORATION

[75] Inventors: Marcel Levecque, deceased, late of Birchrunville, Pa.; by Marc Levecque, administrator, Paris, France; Jean A. Battigelli; Dominique Plantard, both of Rantigny, France

[73] Assignee: Saint-Gobain Industries, Neuilly-sur-Seine, France

[21] Appl. No.: 90,078

[22] Filed: Oct. 31, 1979

Related U.S. Application Data

[63] Continuation-in-part of Ser. No. 926,954, Jul. 20, 1978, Pat. No. 4,199,338, and Ser. No. 917,480, Jun. 21, 1978, Pat. No. 4,194,897, which is a continuation of Ser. No. 762,789, Jan. 25, 1977, Pat. No. 4,102,662, which is a continuation-in-part of Ser. No. 676,755, Apr. 14, 1976, Pat. No. 4,118,213, and Ser. No. 557,282, Mar. 11, 1975, Pat. No. 4,015,964, which is a continuation-in-part of Ser. No. 353,984, Apr. 24, 1972, Pat. No. 3,885,940, said Ser. No. 676,755, is a continuation-in-part of Ser. No. 557,282, , said Ser. No. 926,954, is a continuation-in-part of Ser. No. 834,530, Sep. 17, 1977, Pat. No. 4,145,203, which is a continuation-in-part of Ser. No. 762,789.

[30] Foreign Application Priority Data

Dec. 22, 1978 [FR] France .................................. 78 36189

[51] Int. Cl.³ .............................................. C03B 37/04

[52] U.S. Cl. ............................................ 65/5; 65/16; 65/12; 264/42; 425/7

[58] Field of Search ................ 65/5, 16, 9, 12; 425/7; 264/12

[56] References Cited

U.S. PATENT DOCUMENTS

| | | | |
|---|---|---|---|
| 4,070,173 | 1/1978 | Levecque et al. | 65/5 |
| 4,118,213 | 10/1978 | Levecque et al. | 65/5 |
| 4,137,059 | 1/1979 | Levecque et al. | 65/5 |
| 4,140,509 | 2/1979 | Levecque et al. | 65/5 |
| 4,145,203 | 3/1979 | Levecque et al. | 65/16 |
| 4,146,378 | 3/1979 | Levecque et al. | 65/5 |
| 4,159,199 | 6/1979 | Levecque et al. | 65/5 |
| 4,194,897 | 3/1980 | Levecque et al. | 65/5 |

*Primary Examiner*—Robert L. Lindsay, Jr.
*Attorney, Agent, or Firm*—John T. Synnestvedt

[57] ABSTRACT

Method and apparatus are disclosed providing both for separation of the components of a toration fiberizing center, including separation of both the glass stream supply means and of the secondary or carrier jet from the blast, and at the same time further providing for stabilization of the feed of the glass into the system, notwithstanding the separation of the components. This is accomplished by shielding the jet flow from induced air at one side of the jet and introducing the glass stream into the influence of the induced air at the opposite side of the jet.

16 Claims, 16 Drawing Figures

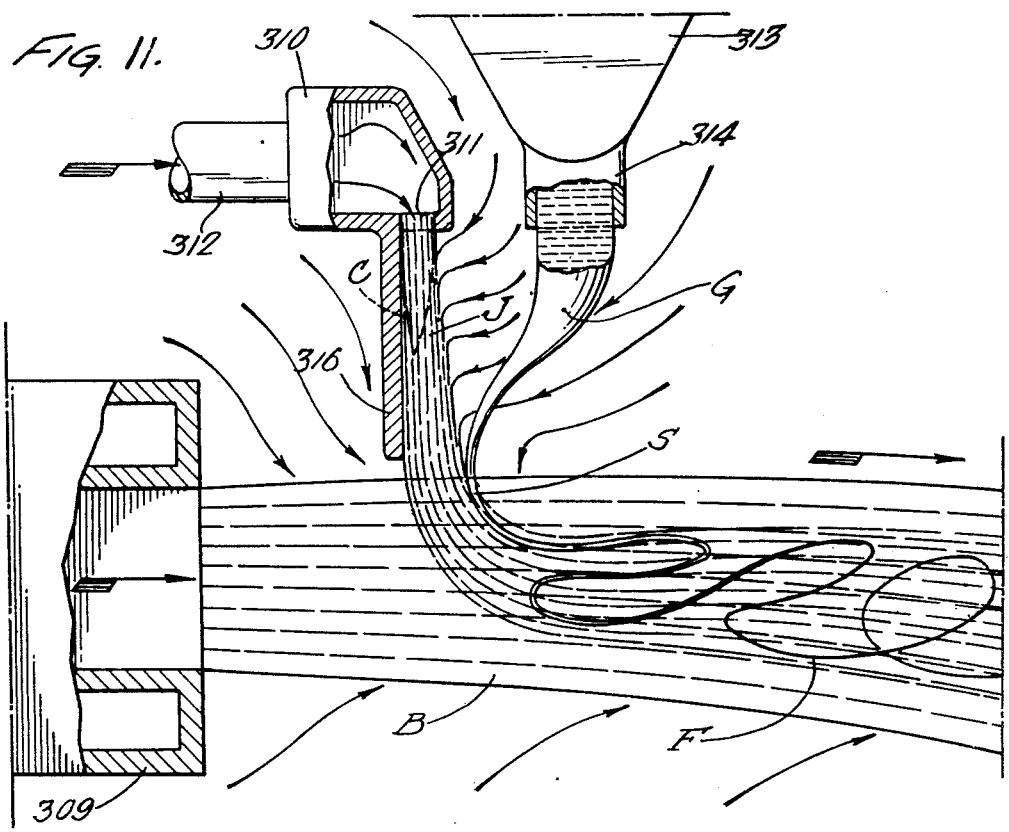
FIG. 11.
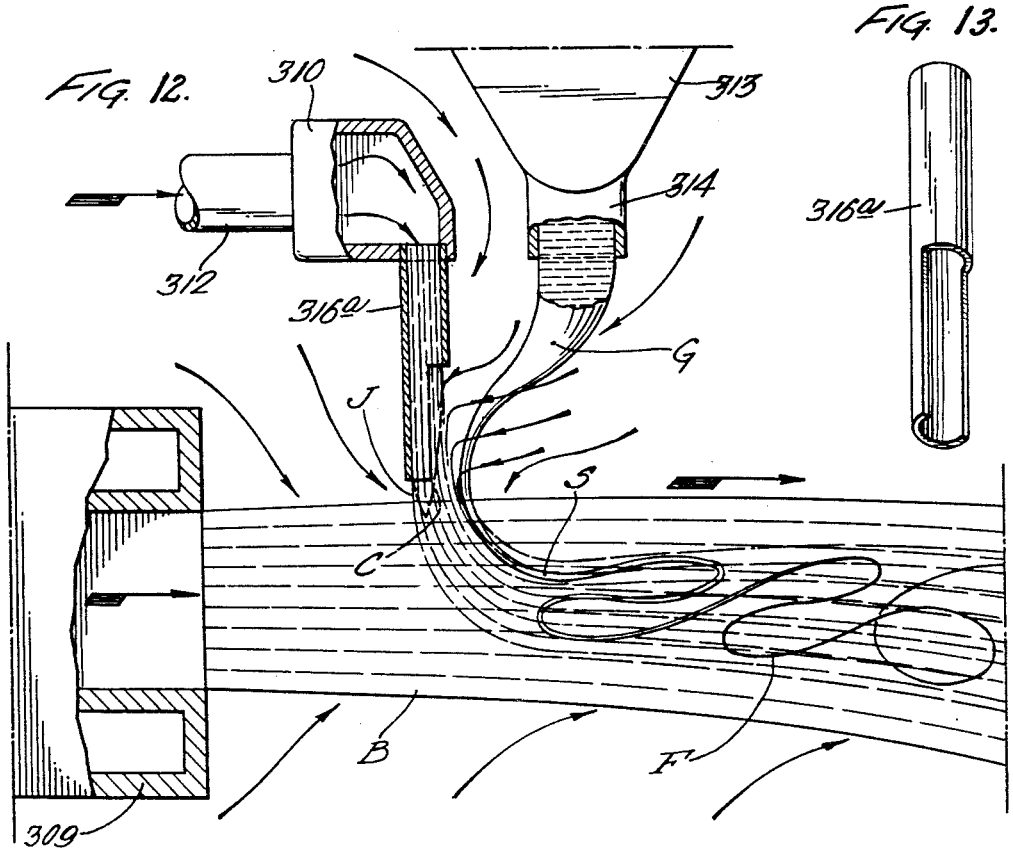
FIG. 12.
FIG. 13.

STABILIZATION OF GLASS FEED IN FIBERIZATION BY TORATION

CROSS REFERENCES

The present application is a continuation-in-part of our application Ser. No. 917,480, filed June 21, 1978, now U.S. Pat. No. 4,194,897 which is a continuation of our application Ser. No. 762,789 filed Jan. 25, 1977 and issued July 25, 1978 as U.S. Pat. No. 4,102,662. Said application Ser. No. 762,789 is a continuation-in-part of our application Ser. No. 557,282 filed Mar. 11, 1975 and issued Apr. 5, 1977 as U.S. Pat. No. 4,015,964 as well as of our application Ser. No. 676,755 filed Apr. 14, 1976 and issued Oct. 3, 1978 as U.S. Pat. No. 4,118,213. Said application Ser. No. 676,755 is also a continuation-in-part of our application Ser. No. 557,282 now U.S. Pat. No. 4,015,964 which in turn is a continuation-in-part of our application Ser. No. 353,984, filed Apr. 24, 1972 and issued May 27, 1975 as U.S. Pat. No. 3,885,940. The present application is also a continuation-in-part of our application Ser. No. 926,954, now U.S. Pat. No. 4,199,338 filed July 20, 1978, which in turn is a continuation-in-part of our application Ser. No. 834,540, filed Sept. 17, 1977, now U.S. Pat. No. 4,145,203 which in its turn is a continuation-in-part of our application Ser. No. 762,789, now U.S. Pat. No. 4,102,662 above identified.

TABLE OF CONTENTS

In connection with the following listing of the headings and in connection with the text of the specification between the headings as inserted in the specification, it is to be understood that not all of the text which intervenes between successive headings is necessarily directly related to the subject of the preceding heading, because in many instances interrelated subjects are jointly considered or are considered in overlapping sequence.

ABSTRACT OF THE DISCLOSURE
CROSS REFERENCES
TABLE OF CONTENTS
INTRODUCTION
BACKGROUND
STATEMENT OF THE PRIOR ART
1. Longitudinal Blowing
2. Strand
3. Aerocor
4. Centrifuging
ANALYSIS OF THE PRIOR ART
BIBLIOGRAPHY OF PRIOR PATENTS
OBJECTS AND ADVANTAGES
BRIEF DESCRIPTION OF DRAWINGS
BRIEF DESCRIPTION OF TORATION
FIG. 1
GENERAL STATEMENT OF VARIABLES
ANALYSIS OF TORATION—FIGURE
JET INTERACTION ACTIVITY
ACTION ON GLASS
FIG. 3
FIG. 4
FIG. 5
FIG. 6
FIGS. 7 and 8
FIGS. 9–16
CLAIMS

INTRODUCTION

The invention relates generally to fine fibers and to the production thereof from a substance in a condition in which it is capable of being attenuated, such substances being hereafter generally referred to as "attenuable materials", particularly attenuable materials which soften or liquefy upon entering a molten state as a result of the application of heat and which harden, or become relatively solid, upon cooling.

The process and equipment of the invention are especially suited to the formation of fibers from glass and the disclosure herein accordingly emphasizes glass fibers and their production.

BACKGROUND

There are four rather well-defined and recognized prior art techniques by which glass fibers can be made, these four techniques, which are mentioned at this point but discussed in more detail herebelow, being:

1. Longitudinal Blowing: Other terms sometimes used include "blown fiber", "steam blown wool", "steam blown bonded mat", "low pressure air blowing", or "lengthwise jets".

2. Strand: Other terms sometimes used are "continuous filament", or "textile fibers".

3. Aerocor: Another term sometimes used is "flame attenuation".

4. Centrifuging: Other terms sometimes used include "rotary process", "centrifugal process", "tel process", or "supertel process".

There are numerous variants of each of the above four processes, and some efforts in the art to combine certain of the processes. Further, there are other techniques discussed in the prior art by which prior workers have attempted to make glass fibers. However, the variants, attempted combinations, and attempted other techniques have not met with sufficient success to achieve a separate and recognizable status in the art.

The present application and the companion applications Ser. Nos. 917,480, 762,789, 676,755, 557,282, and 353,984, above referred to are all concerned with a new, fifth technique which is unique in principle and practice, and which brings about unique results, and therefore is the starting point of a new art. Since the inventions of both the present and the companion applications are closely related, a full disclosure of the common subject matter of the present application and of the prior applications is included in the present application. Moreover, in the description of various embodiments of the common subject matter, unless otherwise indicated by statement or context, the references to "the invention" are not to be understood as limited to inventive subject matter of either the present application alone or of any of the companion applications alone.

Because the subject matter concerns a new technique, and also because a diligent search has failed to reveal any suitable existing English word which aptly applies to the new technique disclosed, we have coined the word "torate", a verb, and the word "toration", a noun, to refer to our new technique and product. The usage of these new words in the present specification will illuminate their meanings, but for present purposes it is pointed out that, by our new technique, glass can be "torated" into fibers, the jet and blast which cooperate to effect fiberization can be referred to as the "torating" current or blast, the fibers which result can be said to have been "torated", or to be "torated" fibers, and the process involved can be referred to as "toration".

STATEMENT OF THE PRIOR ART

Attention is now turned to a more detailed survey of the four prior art techniques briefly mentioned above. The numbers appearing within parentheses in the text below refer to prior art references fully identified in the bibliography set forth at the end of this section.

1. Longitudinal Blowing

Longitudinal blowing (items 1, 2, 3 and 4 of the bibliography herebelow) is a glass fiber manufacturing process according to which melted glass flows from the forehearth of a furnace through orifices in one or two rows of tips protruding downwardly from a bushing, the glass being thereby formed into multiple glass streams which flow down into an attenuating zone where the streams pass between downwardly converging gaseous blasts. The blast emitting means are located in close proximity to the streams so that the converging blasts travel in a downward direction substantially parallel to the direction of travel of the glass streams. Generally the glass streams bisect the angle between the converging blasts. The blasts are typically high pressure steam.

There are two longitudinal blowing techniques. In the first technique the attenuating blasts engage already drawn fibers and the product resulting is typically a mat, commonly known as "steam blown bonded mat", suitable for reinforcement. In the second longitudinal blowing technique the attenuating blasts strike directly on larger streams of molten glass and the product resulting is typically an insulation wool commonly known as "steam blown wool".

In a variation (item 5) of the first longitudinal blowing technique, the entire bushing structure and associated furnace are enclosed within a pressure chamber so that, as the streams of glass emerge from the pressure chamber through a slot positioned directly beneath the glass emitting tips of the bushing, this variation being commonly referred to as "low pressure air blowing", and products being commonly known as "low pressure air blown bonded mat and staple yarn".

2. Strand

The strand glass fiber manufacturing process (items 6 and 7) begins in the manner described above in connection with longitudinal blowing, that is, multiple glass streams are formed by flow through orifices in tips protruding downwardly from a bushing. However, the strand process does not make use of any blast for attenuation purposes but, on the contrary, uses mechanical pulling which is accomplished at high speed by means of a rotating drum onto which the fiber is wound or by means of rotating rollers between which the fiber passes. The prior art patents in the field of the strand process are far too numerous to mention and are of no real significance to the present invention. Therefore, it is considered sufficient that the references above are illustrative of the strand process.

3. Aerocor

In the aerocor process (items 8 and 9) for making glass fibers, the glass is fed into a high temperature and high velocity blast while in the form of a solid rod, rather than flowing in a liquid stream as in the longitudinal blowing and strand processes discussed above. The rod, or sometimes a coarse filament, of glass is fed from a side, usually substantially perpendicularly, into a hot gaseous blast. The end of the rod is heated and softened by the blast so that fiber can be attenuated therefrom by the force of the blast, the fiber being carried away entrained in the blast.

4. Centrifuging

In the centrifuging glass fiber manufacturing process (items 10 and 11), molten glass is fed into the interior of a rapidly rotating centrifuge which has a plurality of orifices in the periphery. The glass flows through the orifices in the form of streams under the action of centrifugal force and the glass streams then come under the influence of a concentric and generally downwardly directed hot blast of flames or hot gas, and may also, at a location concentric with the first blast and farther outboard from the centrifuge, come under the action of another high speed downward blast, which latter is generally high pressure air or steam. The glass streams are thereby attenuated into fine fibers which are cooled and discharged downwardly in the form of glass wool.

ANALYSIS OF THE PRIOR ART

It has long been recognized that it is desirable to produce glass fibers exceedingly small in diameter, for example on the order of a few microns, because products made with such fine fibers have remarkable advantages, including strength, good thermal insulating capability and other physical properties. Further, while the length of the fiber is more or less significant according to the purpose for which the fiber is to be used, it is generally desirable that the fibers be long rather than short. Still further, it is highly advantageous, particularly from the standpoint of the economics of fiber production, that a high production rate be utilized in the manufacturing process employed. One way to reach a high production rate is to have a high orifice pull rate. By "orifice pull rate" we mean to denote the amount of production accomplished within a given time from a single fiber producing center. "A single fiber producing center" means one orifice emitting one glass stream in the longitudinal blowing process, the strand process, and the centrifuging process, and it means one rod of glass in the aerocor process. In toration it means one glass cone from which a single fiber is drawn. Pull rates for a given process are typically given in terms of kilograms, or pounds, or tons, per hour, or per twenty-four hour period.

To summarize, it is generally desirable to make very fine fibers, very long fibers, and to make fibers at a high orifice pull rate, but these objectives conflict with each other, insofar as prior art processes are concerned. Therefore it has always been necessary that a selection be made to sacrifice one or more desiderata in order to obtain the others. Further, each of the prior art processes can effectively serve to make only one or a narrow range of products. For example, by the strand process very fine continuous fibers can be made, but the orifice pull rate is low and the resultant product is not economically useable in the form of glass wool. On the other hand, the centrifuging process makes fibers at a relatively higher orifice pull rate but they tend to be short and they are produced in the form of wool and cannot be readily organized to make roving or other reinforcing products or textiles. The wool resulting from the centrifuging process is very satisfactory in products such as building insulation in which considerable ranges of fiber diameters and lengths in the finished product are satisfactory; however, where the insulation and product strength requirements are very high, other techniques of manufacture, such as the aerocor process, are generally employed.

The aerocor process makes long and fine fibers, if orifice pull rates comparable to those of the centrifuging process are used. But the aerocor process cannot be operated at an orifice pull rate high enough to effectively compete with the centrifugal process. As the orifice pull rate in the aerocor process is progressively increased, there is a corresponding increase, unavoidably, in fiber diameter, until a certain diameter is reached and if the orifice pull rate is increased even further, the glass rod utilized in the process will tend to pass through the gaseous blast without being completely melted and this results in the inclusion in the product of an unacceptably high number of bent pieces of relatively coarse glass fiber, these bent pieces being known as hooks.

In the above described first longitudinal blowing technique the fibers in the bonded mat are long and uniform in diameter, but the orifice pull rates are relatively low. An attempt to increase the orifice pull rates generates unfiberized material having the shape of insufficiently drawn glass drops.

It is the prime characteristic of the invention to obtain fine and long fibers at very high orifice pull rates.

In the second longitudinal blowing technique the orifice pull rates can be very high, but the attenuating blasts break the glass streams prior to attenuation with the result that a large portion, even up to 50%, of the glass is unfiberized and lodges in the wool product in the form of slugs; further, the fiber is very short and irregular in diameter.

It is an important characteristic of the invention to obtain the fine and long fibers at high pull rates, as discussed above, while at the same time producing fiber practically free of unfiberized material.

Many prior workers have made repeated efforts to optimize the manufacture of glass fibers by one or more of the processes which start with molten streams of glass. Various of these prior art techniques have been concerned with trying to optimize the attenuation process by extending or lengthening the attenuation zone, either by providing special means to accomplish the addition of heat to the streams of glass and to the embryonic figers (item 12), or through the use of confining jets (items 13 and 14), or both (item 15).

The approach taken in the just mentioned prior art technique suggests that the realization of optimum fiberization lies in extending the length of the attenuating zone.

Contrary to such teachings, in the practice of the present invention, attenuation is accomplished in the course of a short path length, on the order of one to two centimeters. Therefore, as will be more readily apparent from the explanation of the subject invention which follows, it is an important characteristic of the invention that the fibers are removed, very early in the process, to a cool zone, in which no further attenuation is possible.

Various other approaches have been suggested for introducing glass in the molten state into an attenuating blast (items 16, 17, 18 and 19). In such attempts to introduce a stream of molten glass into an attenuating blast it has been noted that there often is a tendency of the glass stream to veer to a path of travel on the periphery of the blast, that is, to "ride" the blast, rather than penetrating into the core region of the blast where attenuating conditions are more effective. Suggestions have been made to deal with this "riding" problem, including the use of physical baffles as in Fletcher (item 16), and the transfer of substantial kinetic energy to the glass stream as, for example, by the modifications of the centrifuging process taught in Levecque (item 11), Paymal (item 18), and Battigelli (item 19).

An alternate approach to the problem, more closely akin to the aerocor process, has been the introduction of the glass in the form of a solid (item 9) or presoftened (item 20) glass rod or in the form of powdered glass (item 14).

In contrast, it is another important characteristic of the invention to introduce glass in the molten state, in a progressive and very stable way, into an attenuating zone where the attenuating parameters are the most efficacious.

BIBLIOGRAPHY OF PRIOR PATENTS (1) Slayter et al U.S. Pat. No. 2,133,236
(2) Slayter et al U.S. Pat. No. 2,206,058
(3) Slayter et al U.S. Pat. No. 2,257,767
(4) Slayter et al U.S. Pat. No. 2,810,157
(5) Dockerty U.S. Pat. No. 2,286,903
(6) Slayter et al U.S. Pat. No. 2,729,027
(7) Day et al U.S. Pat. No. 3,269,820
(8) Stalego U.S. Pat. No. 2,489,243
(9) Stalego U.S. Pat. No. 2,754,541
(10) Levecque et al U.S. Pat. No. 2,991,507
(11) Levecque et al U.S. Pat. No. 3,215,514
(12) Stalego U.S. Pat. No. 2,687,551
(13) Stalego U.S. Pat. No. 2,699,631
(14) Karlovitz et al U.S. Pat. No. 2,925,620
(15) Karlovitz U.S. Pat. No. 2,982,991
(16) Fletcher U.S. Pat. No. 2,717,416
(17) Eberle U.S. Pat. No. 3,357,808
(18) Paymal U.S. Pat. No. 3,634,055
(19) Battigelli U.S. Pat. No. 3,649,232
(20) Stalego U.S. Pat. No. 2,607,075

OBJECTS AND ADVANTAGES

In contrast with all of the foregoing, it is a major objective of the present invention to provide a technique for producing glass fibers (as well as the resulting fibers themselves) in which it is not necessary to sacrifice any one of the major desiderata above referred to, namely, fineness of fiber, long fiber length and high pull rate.

Because of the accomplishment of the above major object, with the technique of the present invention, it is possible to produce fibers adapted to a much wider range of uses than has been practicable with any one of the presently known techniques.

Another object of the invention is the provision of a technique for producing mineral fibers which is readily adaptable to adjustment of operating conditions so as to selectively produce fibers adapted to a wider variety of uses than has been practicable heretofore. The broad range of fiber types and characters capable of being produced by the technique of the present invention makes it unnecessary in many situations to rely upon more than one technique or process for various different products. In the glass fiber industry this presents outstanding advantages because of the capability of producing a wider range of products with a single technique, thereby eliminating substantial investment in capital equipment which would otherwise be required in order to produce the same range of products by presently known or conventional techniques.

The invention further has in view the provision of a technique for producing glass fibers in which various limitations of the prior art techniques are eliminated. For example, the technique of the present invention requires only static equipment, in contrast with the widely used centrifuge method in which the fiberizing equipment rotates at high speed, thus necessitating special high precision machinery and maintenance. Static equipment makes it possible to construct the equipment from materials which have very high strength at high temperatures in static conditions, without the need to have high temperature strength in dynamic conditions. This allows fiberizing a broader range of materials.

As another example of eliminating prior art limitations, the technique of the present invention greatly simplifies and facilitates the introduction of molten glass into the interior of a blast for purposes of attenuation, the means or system for accomplishing such introduction of the glass in the process of the invention being explained more fully hereinafter. This feature of the invention is in striking contrast to various of the prior art systems for introducing glass into an attenuating blast, such as the aerocor process above described, in which a solid glass rod is fed into the blast, to be softened and melted. As above pointed out this type of system is severely limited with respect to pull rate and has a tendency to develop "hooks." In contrast, the feed of the molten glass into the attenuating zone within the torating blast in the technique of the present invention makes possible much higher orifice pull rates than are possible with the aerocor process, and this is accomplished with the technique of the present invention with a negligible amount of unfiberized material and moreover, while maintaining fineness of fibers.

A still further object of the present invention is to povide a technique for making mineral fibers in which a wider variety of batch formulations may be utilized in the making of fibers, over a wide range of fiber properties or characteristics, than is possible with any one of the presently known processes.

In addition to the foregoing, various embodiments of the invention have further advantages incident to the separation of various components of the fiberizing centers from each other, as will be explained hereinafter in portions of this description specifically concerned with the several embodiments of FIGS. 6–16.

Still another object of the present invention is to provide a toration technique for making mineral fibers such as glass fibers in which the feed of molten glass into the attenuating zone is independently stabilized for each fiberizing center by control of induced air currents as is fully set forth in the description below of the embodiments of FIGS. 9–16.

The foregoing and other objects and advantages which are attained, including numerous specific advantages flowing from toration will be explained more fully hereinafter.

BRIEF DESCRIPTION OF THE DRAWINGS

FIG. 11 is a view similar to FIG. 10 but illustrating a modified positional relationship of the components of a fiberizing center of the kind shown in FIG. 10;

FIG. 12 is a view similar to FIG. 11 but ilustrating another embodiment, as will be further described;

FIG. 13 is an enlarged view of a jet shielding element of the kind employed in FIG. 12;

TORATION

The terms "toration," a noun, and "torate," a verb, as mentioned above and as used herein, constitute contractions of the words "tornado" and "attenuation" and are used to denote the action on an attenuable material in the zone of interaction created when a blast, or first jet, is penetrated by a transversely oriented second jet, the latter being completely encompassed or enveloped by the former. Clearly defined and forceful currents, including two counter-rotating tornadoes, or whirls, or vortices, having substantial angular velocity, are generated by the interaction of the two jets, and these currents, by frictional licking or sweeping against the surface of the attenuable material, exert forces tending to induce the attenuable material to flow toward and into the zone of interaction; the material then is brought more and more under the influence of the tornadoes and forms itself into an elongated cone from the tip of which a fine fiber is drawn by the combined flows of the jets. It is surprising that, although located in a whirling zone with very high velocities, the glass cone nevertheless is stable and that its cross section reduces progressively from its base at the plane of emission to its tip, from which a single fiber starts. It is also very surprising that this fiber, although, at least part of the time, it has a nearly helicoidal movement at an increasing amplitude and velocity, continuously emanates from the cone in a continuous attenuation process.

The virtual lack of slugs in the fiber manufactured by toration is due to the dimensional and positional stability of the glass cone and to the continuity of the unique fiber attenuation.

The interaction phenomenon as described hereabove and which is of fundamental importance to the invention, can occur with a plate limiting one of the borders of the blast and through which the secondary jet is flowing. This same phenomenon can take place in embodiments, such as that of FIG. 12 described in which the plate is so small that it is virtually non-existant, or even without any plate. The interaction phenomenon is essentially the same, whether or not there is a plate. Since we prefer to employ at least some form of plate, although it may be of quite limited extent, in the following description we emphasize embodiments in which there is a plate.

FIG. 1

Figure 1:
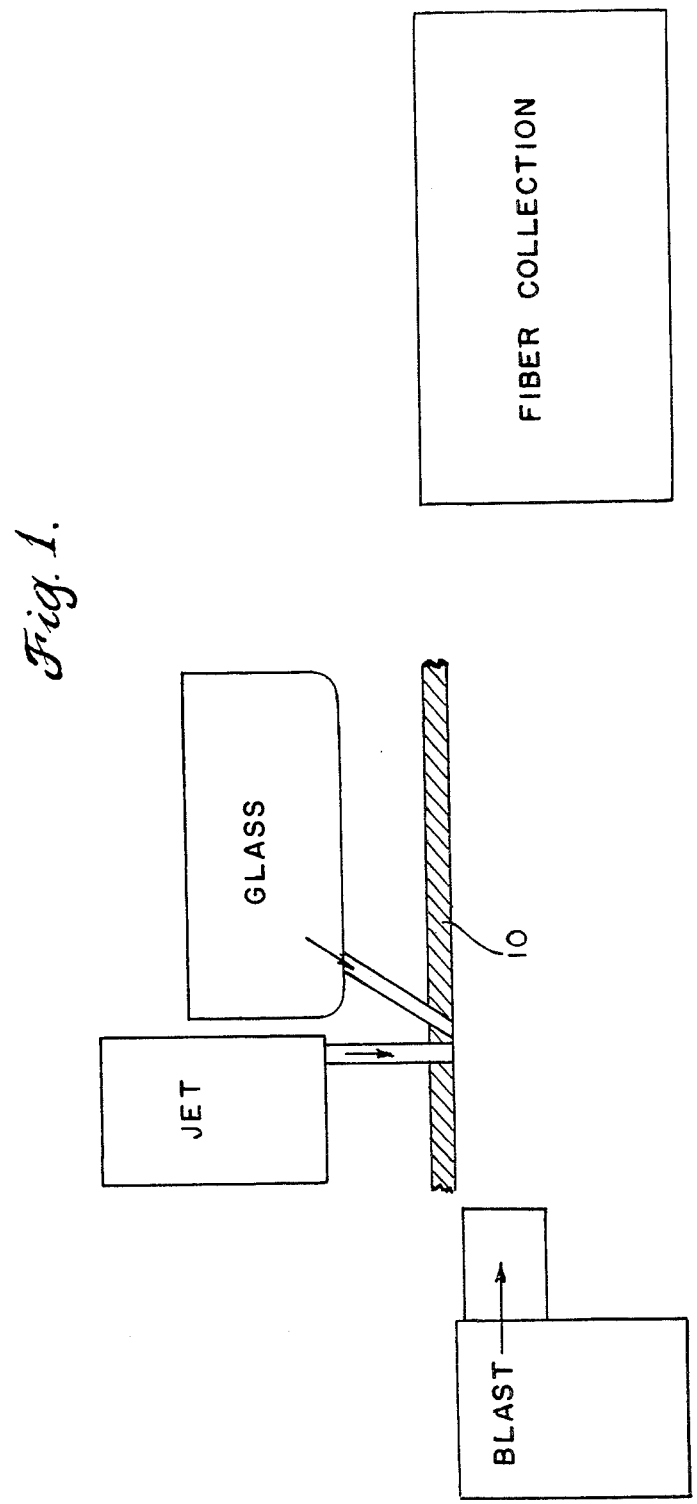
FIG. 1 is a diagrammatic representation of the major components of one system according to the invention, showing the general interrelation of the components for producing a blast and for producing a jet transverse to the blast, as well as the glass supply means and the fiber collection device.

Referring first to FIG. 1, a blast, or primary jet source, is indicated at the left, being arranged to deliver the blast along a surface, in this case the undersurface, of a plate or wall 10. The source of a secondary jet is also indicated, being arranged to deliver through the plate 10 so as to penetrate into the blast. The attenuable material, such as glass, is also delivered through the plate 10, and in the embodiment of FIG. 1 the point of delivery of the glass into the blast is just downstream of the point of delivery of the jet into the blast. An appropriate fiber collection means is indicated at the right in FIG. 1.

GENERAL STATEMENT OF VARIABLES

One possible way to control the quantity, quality, and size of the resulting fibers is by regulating the flow rate of the attenuable material. The regulation of the flow rate of attenuable material can be accomplished in a number of ways, e.g., by varying the temperature of the attenuable material so as to alter its viscosity characteristics. In the case of glass, generally speaking, the higher the temperature the lower the viscosity; further, when changes in the constituents of the glass are made so as to obtain different fiber quality, in view of its end use, such changes in the constituents of the glass can effect changes in the viscosity at a given temperature.

Other parameters which can be manipulated in order to control toration include the blast and jet fluid compositions, and the temperatures and the velocities of the blast and the jet. Typically, the interacting jets are composed of the same fluid, such as the products of combustion resulting from the burning of a suitable gaseous fuel, and in such circumstances the performance of toration, throughout a considerable temperature range, can be gauged in terms of the relative velocities of the primary and secondary jets. However, it must be kept in view that any substantial differences between the densities, or the viscosities, of the two jets can have a quite considerable impact on toration, and these additional factors can be accommodated in toration by taking account of the kinetic energies of the fluid streams, rather than just their velocities. As explained in more detail herebelow, the kinetic energy of a given volumetric unit of a fluid stream is directly proportional to the product obtained by multiplying its density by the square of its velocity.

In order to effect toration, the kinetic energy of the jet per unit of volume must be greater than that of the blast in the operational area thereof, as hereafter defined.

Additional control over the results obtainable by toration can be exercised by varying the orifice sizes, positions and configuration, particularly with respect to the secondary jet. Additional refinements to the basic apparatus are discussed below with respect to the various illustrated embodiments of the present invention.

ANALYSIS OF TORATION—FIG. 2

Figure 2:
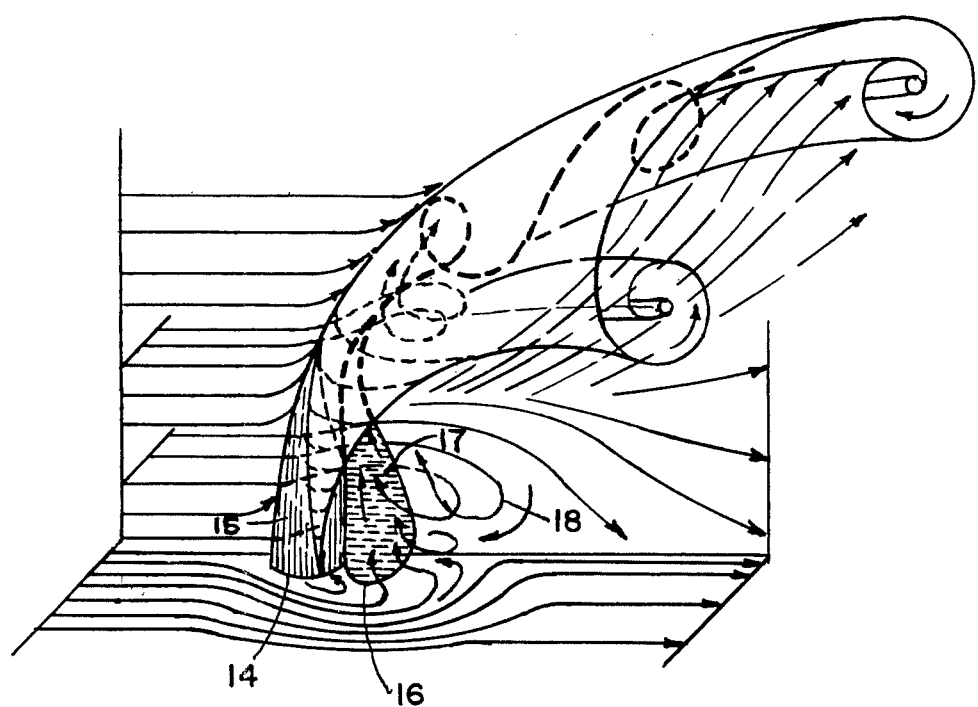
FIG. 2 is a diagrammatic perspective view showing a pattern of flow of gases and glass which is typical of toration, this view being inverted as compared with FIG. 1, that is, showing the glass and jet flowing upwardly instead of downwardly.

In further explanation of the operative forces responsible for toration, reference is made to FIG. 2 which present, in part, our actual observations and, in part, our theoretical suggestions and conclusions as to the zone of interaction created by intersecting jets and as to the resultant fluid flow which gives rise to the whirl or miniature tornado phenomena hereinbefore referred to as being of importance in toration. FIG. 2 shows the same general arrangement of the components of a fiberizing center as in FIG. 1 but with the secondary jet in inverted position as compared to FIG. 1, that is the jet is directed upwardly instead of downwardly, and further FIG. 2 is on a very much enlarged scale as compared to FIG. 1. It is to be understood that the toration fiberizing center may be arranged in any desired relation to the horizontal.

In the representation of toration as appearing in FIG. 2, the principal jet or blast travels from left to right. The secondary jet 15 is oriented substantially perpendicular to the principal jet and, in a sense, can be said to intercept it, with respect to a part of the blast. The relative relationship of the principal jet and the secondary jet is such that the secondary jet is completely enveloped by the principal jet. The significance of this operative relationship will become more readily apparent from the analysis of the complete process of toration which is presented herebelow.

JET INTERACTION ACTIVITY

The blast splits and flows around the secondary jet while the secondary jet substantially maintains its thrust and its integrity, and can be said to pierce through the blast.

Since the secondary jet is unconfined (in the sense that it is not within a tube or other solid-walled flow passage), its flow at its periphery induces some fluid of the blast to flow along with it, that is, some fluid of the blast is carried along with the flow of the secondary jet. The interaction results in the generation of a region of relatively reduced pressure that is, negative pressure, immediately downstream of the secondary jet.

The split portions of the blast flow around the secondary jet toward the negative pressure region and thus rejoin each other to form strong recirculation currents shown in FIG. 2 by blast flow arrows 18 which curve right around on themselves, and also curve upwardly, and indicate flow having a component generally from right to left, counter-current to the blast which, as above mentioned, is flowing generally from left to right.

The extent of the negative pressure region is a function of the ratio of the kinetic energies, per unit of volume, of the blast and jet. In the upstream-downstream sense the negative pressure region extends about 2 to 3 jet orifice diameters and in the lateral sense it extends about 1 to 2 jet orifice diameters.

The zone of interaction of the blast and the jet gives rise to the formation of two oppositely rotating tornadoes, or whirls, one on each side of the secondary jet slightly downstream of the midpoint thereof. As clearly shown in FIG. 2, these two tornadoes, or embryonic, vortices, swell substantially as they whirl upwardly and turn in a downstream direction.

Thus, is characterized by the inception of the two oppositely rotating tornadoes and by a region of negative pressure immediately downstream of the base of the secondary jet, the negative pressure being quite pronounced in the region between the bases of the tornadoes and in the region immediately downstream thereof.

As the secondary jet loses its individuality, that is, its initial velocity and direction characteristics, it gives rise to a new flow, a mixture of the jet and blast which can be called a torating flow or torating blast.

The layers of the blast which are adjacent the jet and flow alongside it give the tornadoes their direction of rotation. As a result of this direction of rotation, a fluid particle placed on the outer layers of either tornado would be carried over toward the concavity of the above mentioned double volute, being caught by the two tornadoes like between two counter rotating calendar rollers.

While the outer layers of the tornadoes rotate at velocities which are identical to the velocities of the layers of the blast adjacent the tornadoes, the interior or central portion of each of the tornadoes turns around its own axis at very high speed. Thus, each tornado has an induction effect, in an inward and upward direction, on the adjacent portions of the blast which are flowing around the secondary jet. The induced flow is directed upwardly along and inwardly into the concavity constituting the deformed shape of the residual secondary jet flow and of the mixing layer.

It is surprising that, while the fluid flows at very high velocities in the central portion of each of the tornadoes, these tornadoes are nevertheless stable; their apexes appear to be affixed to the edge of the secondary jet orifice, slightly downstream of the axis thereof, and the gaseous envelopes of the tornadoes are practically immobile.

ACTION ON GLASS

The glass is either emitted directly into the low pressure zone immediately downstream of the secondary jet, or is drawn into this zone in situations in which it is supplied some distance from it. The flow of the glass into this region can be relied upon to take place clearly, even if the glass emission orifice in the plate 10 is not located immediately adjacent the downstream side of the secondary jet. This is so because the recirculation currents, discussed above, are quite pronounced and strong in Zone I. Stated in another way, the glass localizes in the region of negative pressure just downstream of the secondary jet.

When viewed as in FIG. 2, the glass is drawn upwardly from the glass orifice 16 in a plate at the boundary of the blast under the combined action of the gaseous currents and forms itself into a stable cone. Within the body of the glass, the glass travels out into the cone, essentially by laminar flow, and continuously, uniformly and progressively decreases in cross sections as it flows toward the apex of the cone. The steady diminution in cross section is important to the production of a fiber of substantially uniform diameter along its length and insures the continuity of fiberizing.

From inspection of FIG. 2 it can be seen that the diminution in cross section of the glass takes place during, and in phase with, the expansion in the cross section of the two tornadoes, the flow of the glass into the cone occurring within the concavity formed by the tornadoes and the downstream side of the secondary jet. Thus, the glass cone is protected or shielded from the disruptive impact which the blast would have upon it. A resultant is the stability of the flow of the glass which is an important characteristic of toration.

Next to the plate the tornadoes or whirls are of very small cross section and the frictional surface interaction thereof against the glass is of quite limited extent. At locations progressively farther and farther away from the plate, the tornadoes are progressively larger and larger and have progressively larger surface contact with the glass, the consequence being that the tornadoes have a progressively increasing influence on the glass attenuation.

What has been described thus far comprises a process for delivering attenuable material in a molten state at a steady reproducible rate, and in a stream of cross section which is continuously and progressively reducing, into a region in which it can be drawn out into a fine fiber. In other words, the description up to this point concerns the supplying of the glass, in a molten state, to a region of high velocity gaseous flow.

The final phase of the attenuating process, i.e., the drawing out of the attenuable material into very fine fibers, takes place within a short length of glass flow from the tip of the cone and thus extends for only about 3 to 5 jet secondary orifice diameters.

Toration is characterized by dramatically dynamic action. While we have witnessed the behavior of the glass by the naked eye and by means of high speed motion pictures, the experience undergone by the attenuable material occurs far too fast to be seen by the naked eye, and even too fast to be clearly captured by motion pictures. We have made extensive studies using motion pictures taken at 4,000, 6,500 and 10,000 frames per second and projected at speeds down to one frame per second. These studies have shown with certainty that from one cone tip there is only one single fiber drawn; but there remains an element of uncertainty as to the exact path of travel of this fiber.

What has been observed, particularly by means of the high speed motion pictures above mentioned, is a smooth continuously repetitious, whipping action which appears to occur in a single plane but which more probably, because of the rotational nature of the whirling or vortical motion in the region of attenuation, actually follows a helical path, the pitch and the amplitude of which are increasing in the flow direction, for at least a substantial part of the time.

The whipping action of the fibers, as fully described in connection with the above discussion of the zones of toration, sometimes causes a fiber to touch against various parts of the equipment, particularly the plate through which the attenuable material is emitted and especially in the region thereof downstream of the fiberizing center. If the equipment so touched by the fiber is hot, there may be a tendency for the fiber to stick, in which case a length of fiber may melt and drop into the product as a piece of unfiberized material.

Figure 10:
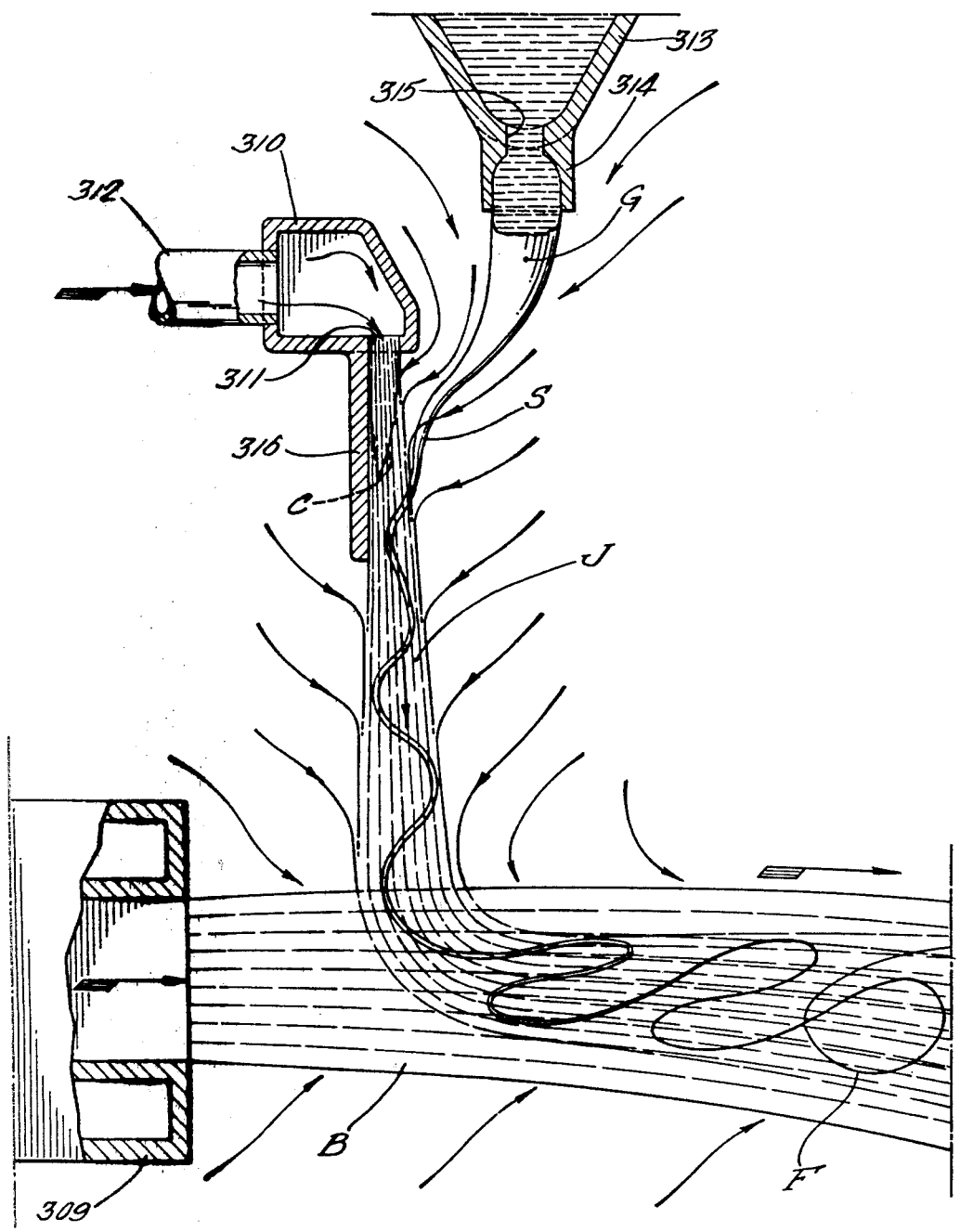
FIG. 10 is an enlarged vertical sectional view through the components of one of the fiberizing centers in the embodiment of FIG. 9, and particularly illustrating the induction of ambient gas into the jet.

Certain provisions for minimizing such risk of the sticking of fibers, and also for avoiding undesirable cooling of the bottom of the crucible, are illustrated in FIGS. 10 and 11, which show alternative embodiments also incorporating still other features, as will be seen from the following.

FIG. 3

Figure 3:
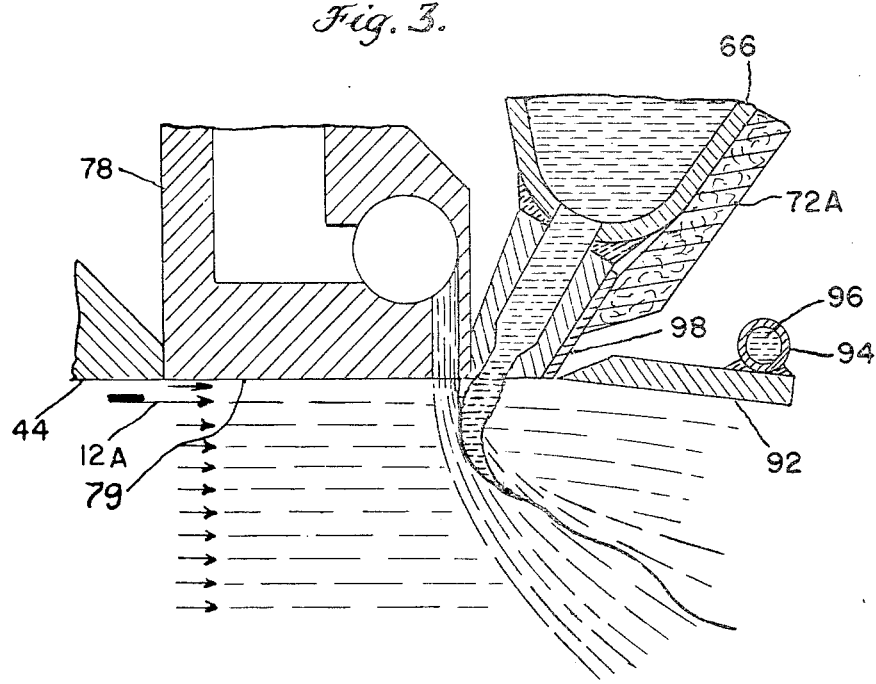
FIG. 3 is a sectional view of another embodiment, in which a water cooled plate is utilized adjacent the path of the blast downstream of the fiberizing center.

The arrangement of FIG. 3 includes a downstream metal plate 92 having a cooling tube 94 mounted in heat transfer relation to the plate in order to provide for circulation of a cooling liquid 96. The plate 92 is advantageously formed of a metal having good heat conduction characteristics, for instance copper. With this arrangement, even if the whipping action of the fibers being formed brings the fibers into contact with the surface 92, the fibers will not have a tendency to stick and build up because of the fact that the surface is cooled. An arrangement of this kind aids in avoiding possible accumulation of fibers on the surface of the equipment.

With further reference to FIG. 3, the burner lips are indicated at 44, and a carrier jet chamber is indicated at 78, the glass crucible being shown at 66. However, in FIG. 3 an asbestos board 72A is applied to the crucible 66 in a position to aid in minimizing heat loss, thereby maintaining the desired crucible and glass temperature especially in the region of feed of the glass to the glass supply orifice. Such an insulating shield may be employed in a position more or less directly exposed to the blast, but in installations having a blast defining wall element or surface which is cooled, such as the downstream plate 92, the plate is interposed between the gaseous flow and the shielded crucible.

The plate 92, however, is extended in the upstream direction to a point relatively close to the glass supply port, and in order to avoid excessive cooling of the glass adjacent to the discharge orifice, a protective shield of mica indicated at 98 may be introduced. The plate 92 may be oriented, with respect to the plane of the bottom wall 79 of chamber 78, that is, the plane of emission, at a slight angle, as shown. We have found that an angle of between about 3° and about 20° is appropriate, and we prefer an angle in the lower end of this range.

FIG. 4

Figure 4:
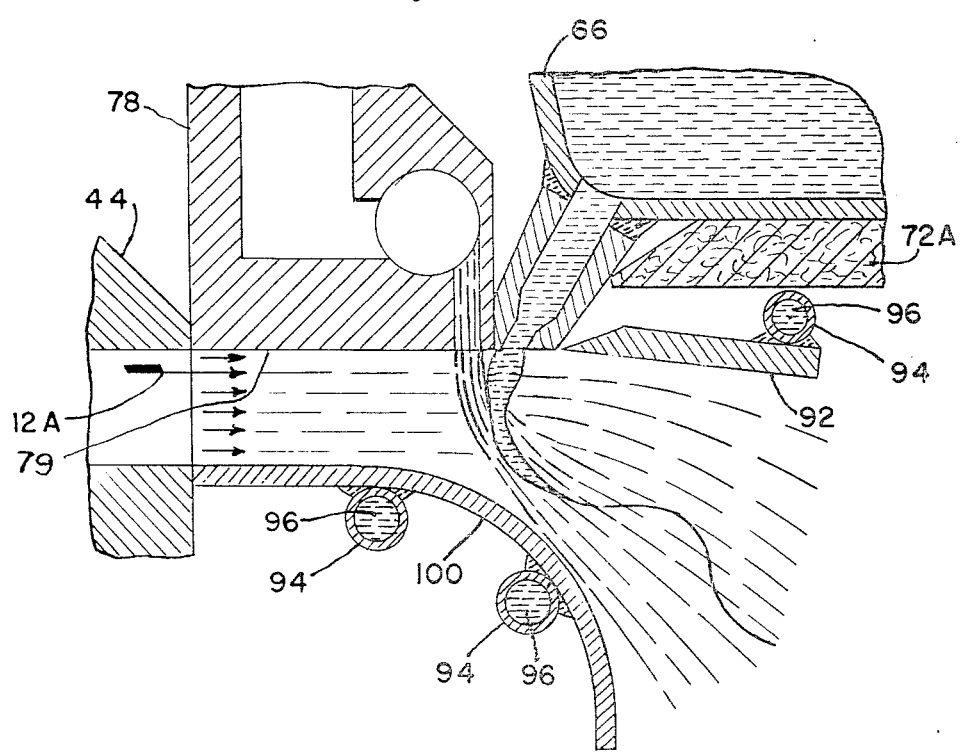
FIG. 4 is a view similar to FIG. 3 but further showing the use of a water cooled deflector adjacent the side of the gas blast opposite to the fiberizing center.

A similar arrangement of components is shown in FIG. 4, but in FIG. 4 there is further illustrated a lower deflector 100 arranged at the side of the blast opposite to the fiberizing center and preferably curved downwardly in the region opposite to the fiberizing center. This deflector 100 is also desirably provided with pipes 94 in heat exchange relation to the deflector and serving to carry a coolant 96 so that in the event that the whipping action of the fiber causes it to touch the deflector 100, the fiber will not stick to the surface of the deflector.

With respect to the wall elements 92 and 100, it is to be noted that these elements aid in deflecting the flow of gases, particularly downstream of the fiberizing center, and this aids in stabilizing toration, as well as in reducing the risk of the fibers adhering to the surfaces of the equipment.

A noticeable difference in the posture of the cone of attenuable material is observed, particularly when the lower deflector 100 is employed. In the latter case, the tip of the cone of attenuable material appears to project more directly into the core of the blast.

The downstream plate 92 and the lower deflector 100 constitute effective means for guiding and stabilizing the flow resulting from the interaction of the two jets, more or less independently of the velocities of the jets, which makes possible the production of a fiber of highly constant quality. In other words, the downstream plate 92 and deflector 100 constitute means for broadening the range of conditions under which successful operations can be performed for favorably influencing the quality of the fibers produced, although it is pointed out that other embodiments of the equipment are also capable of producing high quality fibers, without the use of such plates or deflectors.

Multiple fiberizing centers are desirably provided in order to maximize production with given equipment and one arrangement for achieving the multiplication of the fiberizing centers is to provide one or more series of fiberizing centers spaced from each other in a zone extended transversely or laterally of the blast.

FIG. 5

Before describing FIG. 5 in detail the following should be noted by way of general comparison of the arrangements described above and the arrangement of FIG. 5.

In the arrangements illustrated in the figures described above, the glass admission means, in most cases a glass admission orifice, is located at or substantially at a boundary of the principal jet or blast. In addition in all embodiments already described, the orifice through which the secondary or carrier jet is discharged is also located at or substantially at the same boundary of the principal jet or blast. However, for at least some purposes, it is advantageous and desirable to provide for some separation between the orifices and the boundary of the blast. For instance, such separation facilitates control of the atmosphere surrounding the crucible from which the glass is supplied, and such separation also makes possible employment of certain crucible heating arrangements which would not conveniently be accommodated in situations where the glass admission orifice is located at a boundary of the blast.

Figure 5:
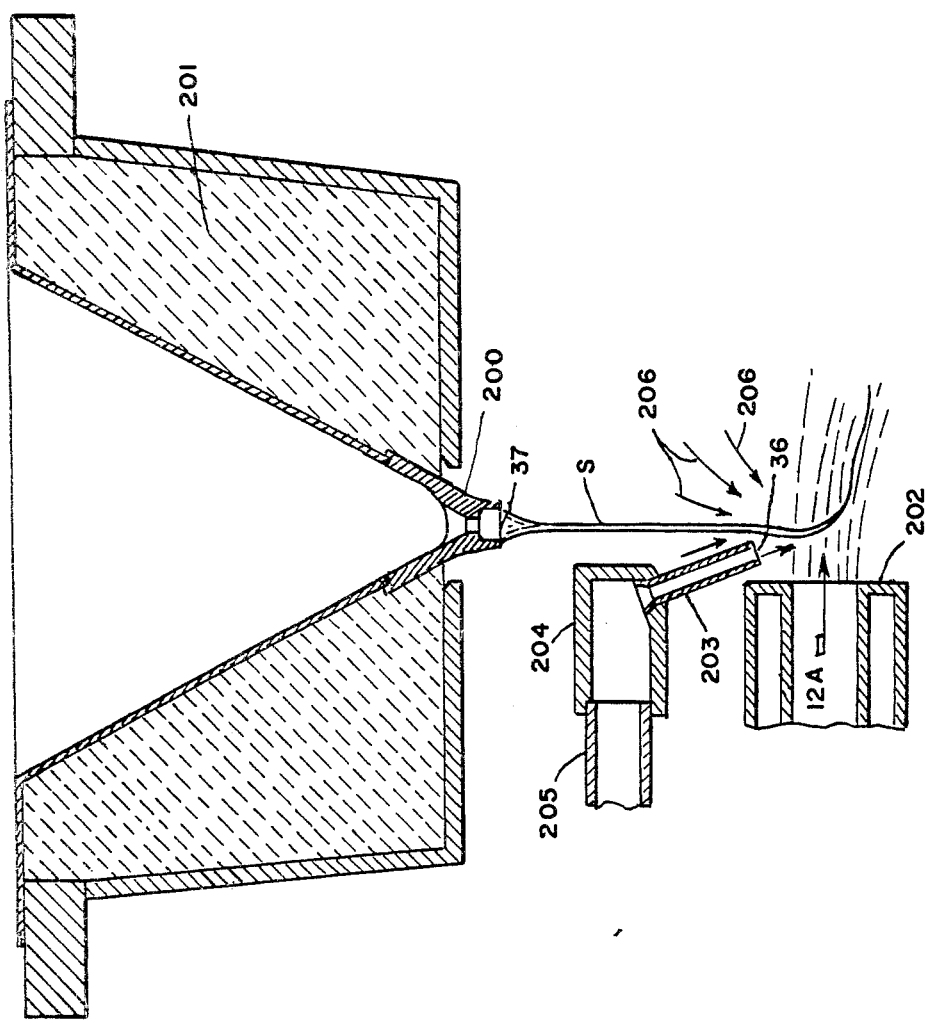
FIG. 5 is a vertical sectional view through a fiberizing center including means for generating a blast, means for generating a secondary jet, and a glass supply means including a glass supply orifice spaced substantially above the upper boundary of the blast.

The arrangements of FIG. 5 provides for separation of the glass admission orifice or glass admission means from the boundary of the blast. This may be accomplished by variations of apparatus and method as compared with the embodiments described above, and a number of the embodiments of the equipment shown in FIG. 5 not only accomplishes the foregoing general purpose of providing separation between the glass admission orifice and the boundary of the blast, but also affords other advantages, as is described herebelow.

Referring first to the arrangement shown in FIG. 5, a crucible is indicated at 200, being associated with some appropriate glass supply means such as a forehearth 201. The blast 12A is delivered from the structure 202 in a horizontal direction in a position spaced well below the glass crucible 200. The secondary jet orifice 36 constitutes the lower open end of the jet tube 203 which is supplied from the manifold 204 connected with a burner or other source of secondary jet gas by means of the duct 205. It will be noted that the jet tube 203 is positioned at an angle to the axis of the blast 12A and further that the jet orifice 36 is spaced above the upper boundary of the blast delivered from the structure 202. The jet interacts with the blast to produce a zone of interaction as described in detail above, said zone lying substantially vertically below the glass admission orifice 37. The glass is admitted in the form of a stream S descending by gravity from the orifice 37 and entering the zone of interaction of the jet with the blast, with consequent introduction into the fiberizing and attenuating zone in the manner already fully described.

The vertical spacing of the glass admission orifice 37 above the upper boundary of the blast 12A may be of the order of 10 to 100 mm. In addition, the vertical distance from the jet discharge orifice 36 and the upper boundary of the blast may be of the order of 5 to 10 mm.

In this arrangement, the intraaxial distance between the orifices 36 and 37 measured in the upstream-downstream direction of the blast 12A may be from about 4 to 10 mm. Still further, because of the positioning and spacing of the various components making up the fiberizing center, it is desirable that the jet tube 203, and thus the jet discharged therefrom should be inclined with respect to the axis of the blast 12A. The angle of the jet with respect to the axis of the blast should be less than 90°, for instance from about 45° or 50° up to about 85°. A preferred range is from about 75° to about 85°. The relationships of spacing and angles should be such as to establish the zone of interaction of the jet with the blast at a point substantially vertically below the glass admission orifice 37. Preferably also the jet tube 203 and thus the jet orifice 36 should be located so that, considered in relation to the direction of flow of the blast 12A, the jet orifice is positioned upstream of the glass stream S, in view of which the inclination of the jet tube 203 results in discharge of a jet having motion generally transversely to the blast, but having a component in the downstream direction of the blast, thereby enhancing the fiberization and the movement of the attenuated fiber downstream of the blast.

Each fiberizing center provided in the manner described in connection with FIG. 5 functions in the general manner fully disclosed in the application for the principal patent above referred to, and the parameters including the kinetic energies of the blast and of the secondary jet in the operational area thereof and the temperatures and velocities of the blast and jet, as well as the temperature of the glass, and the relationship between the sizes of the glass and jet orifices may all generally conform with those parameters as set out above, although it is to be noted that in certain instances some of those parameters may be varied beyond the preferred ranges given.

With the arrangements of FIG. 5, it is practicable to employ a somewhat wider range of ratios of kinetic energy of the secondary jet to the kinetic energy of the blast in the operational area thereof, as compared with the arrangements earlier described hereinabove. Thus, effective results are obtainable within a preferred range of jet to blast kinetic energies extending from about 4:1 to 35:1.

In the arrangements of FIG. 5, the size of the jet orifice may be considerably smaller than that employed in the arrangements of the figures previously described. For instance, with arrangements of the kind shown in FIG. 5, the jet orifice may be considerably smaller than the glass orifice, i.e. from about 1/6 of the size of the glass orifice up to about the same size, may vary from about 0.3 to 2.5 mm. Employing a smaller jet orifice requires concurrently employing a higher jet pressure with other operating conditions maintained at about the same values. Jet pressures running from about 2 bars up to about 25 bars may be used.

In arrangements of the kind disclosed in FIG. 5, the intraaxial spacing of the jet and glass orifices measured in a direction upstream and downstream of the blast may be of the order of 3 to 4 times the diameter of the jet orifice, or from about 1 mm to about 10 mm.

The smaller secondary jet size is economically desirable because of a resultant saving of fuel consumption which would otherwise be needed.

In the operation of a fiberizing center as illustrated in FIG. 5 air currents are induced by the action of the jet delivered from the orifice 36 as indicated by the arrows 206, and these induced air currents influence the position of the glass stream S, tending to draw the stream toward the jet as the boundary of the blast is approached, and this action has a stabilizing tendency, i.e. it tends to assure uniform and stable entry of the glass stream into the zone of interaction of the jet and blast, with consequent uniform and stable introduction of the glass into the attenuation zone.

From FIG. 5 it will be observed that considerable space is provided between and around all of the major components of the fiberizing station, including the crucible, the manifold for supplying jet fluid to the secondary jet tube, and the equipment for generating and discharging the blast. Because of this increase in the spacing of the components at the fiberizing center, the heat transfer from the crucible to the blast and jet generators may more effectively be avoided. This in turn enhances the possibilities of controlling the glass temperature. The arrangement also permits using compositions which melt at much higher temperatures, or alternatively permits achieving higher glass through-puts.

It is to be understood that it is contemplated that the fiberizing centers be employed in multiple transversely of the blast.

The glass admission means used in an arrangement of the kind shown in FIG. 5 may either comprise a simple orifice, or may comprise an arrangement in which the orifice delivers the glass into and through a small passage enlargement or reservoir arranged just downstream of the orifice.

FIG. 6

Figure 6:
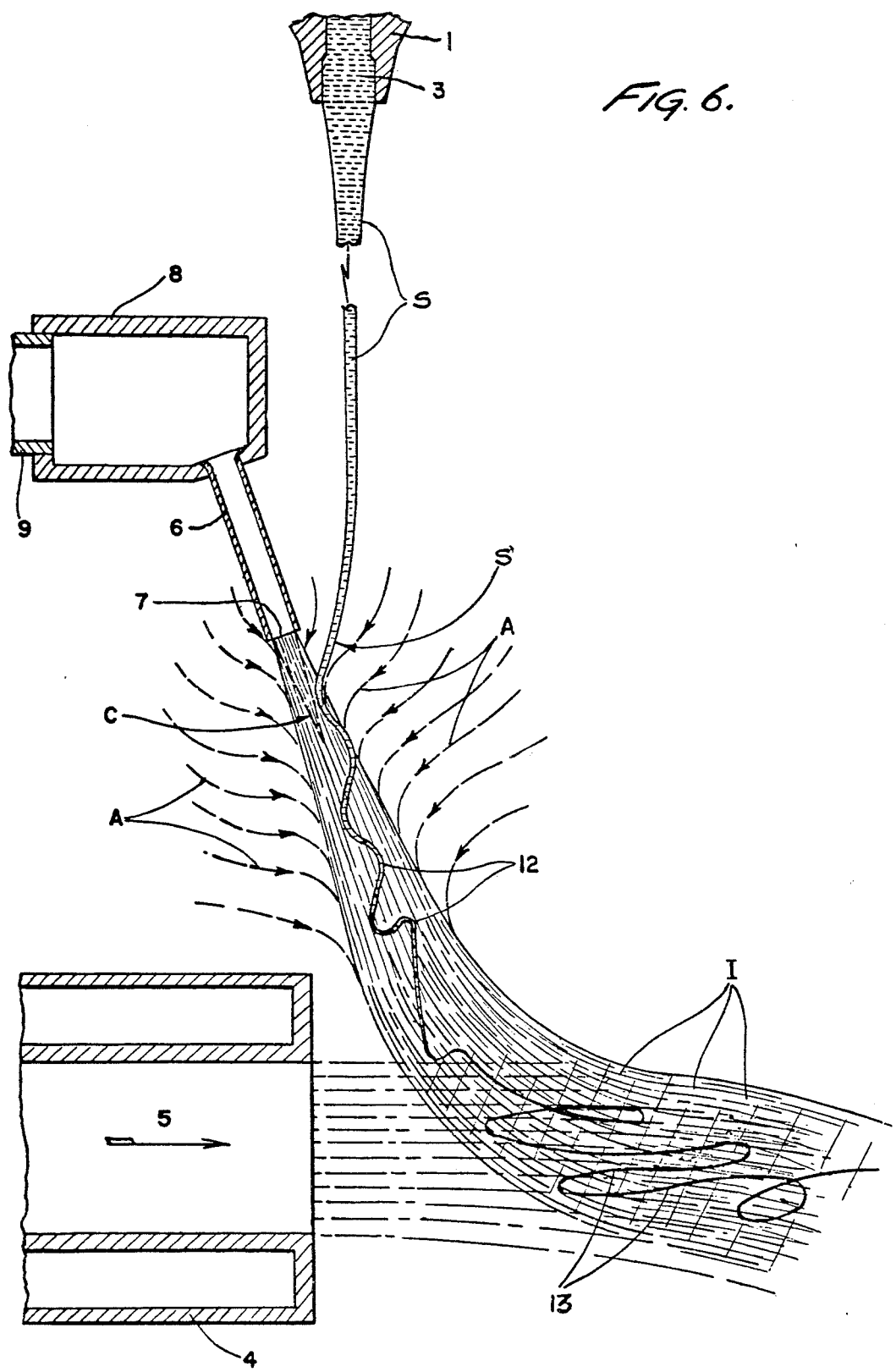
FIG. 6 is a vertical sectional view through the components of a fiberizing center in which both the glass supply means and also the jet generator are spaced from the blast, this figure also appearing in our application Ser. No. 676,755 above identified.

In considering the arrangement of FIG. 6, it is first desired to refer to the general arrangement of FIG. 6 in contrast to the arrangements of FIG. 5. Thus, while the arrangements of FIG. 5 involves some separation of the glass admission means from the boundary of the blast, the arrangement of FIG. 5 nevertheless contemplates in each fiberizing center, the delivery of the glass to the blast in the zone of interaction thereof with the jet. In contrast, in the arrangement of FIG. 6, the glass orifice is not only separated from the boundary of the blast, but in addition, the glass is delivered into the influence of the jet before reaching the blast.

Moreover, in a typical case according to the embodiment of FIG. 6, the blast is discharged in a generally horizontal direction, the glass admission orifices are arranged in spaced relation above the blast, and at an intermediate elevation, secondary jets are discharged downwardly toward the blast from jet orifices positioned adjacent to the decending glass streams, and preferably inclined somewhat with respect to the vertical, so that the glass streams enter the influence of the jets at a point above the upper boundary of the blast, but well below the glass orifices. Preferably also each secondary jet orifice and the associated glass stream are spaced from each other in a direction upstream and downstream of the direction of flow of the blast, with the jet orifice located, with respect to the direction of flow of the blast, on the upstream side of the glass stream.

The system of this embodiment, as just briefly described, functions in the following manner:

Each secondary jet, being spaced appreciably above the upper boundary of the blast, causes induction of the ambient air so that the jet develops a sheath or envelope of induced air which progressively increases in diameter as the upper boundary of the blast is approached. The jet thus is comprised of two portions, i.e. the core itself which is initially delivered from the jet orifice and the main body of the jet which is frequently referred to as the mixing zone, i.e. the zone represented by the mixture of the gas of the core with induced air.

In a typical embodiment, the jet core extends for a distance beyond the jet orifice equal to from 3 to 10 times the diameter of the jet orifice, depending primarily upon the velocity of the jet through the orifice. Since in installations of the kind here involved, the jet orifices are of only very small diameter, the extent to which the jet core is projected beyond the orifice is relatively short. The jet core is conical and the mixing zone surrounds the jet core from the region of delivery from the jet orifice and is of progressively increasing diameter downstream of the jet, including a length of travel extended well beyond the tip of the jet core cone. In such a typical installation, the spacing between the jet orifice and the boundary of the blast is such that the point of intersection of the blast lies beyond the tip of the core, although with certain proportions the jet core may come close to or somewhat penetrate the blast. In any event, it is contemplated that at the point of intersection of the jet and blast, the body of the jet or jet stream retains sufficient kinetic energy or velocity to penetrate the blast and thereby develop a zone of interaction between the jet and the blast. This zone of interaction has the same general characteristics as the zone of interaction referred to and fully described in our prior applications Ser. No. 557,282 and Ser. No. 353,984, above identified.

With the foregoing in mind, attention is now directed to the glass stream and its behavior in relation to the jet and blast. As already noted, the glass stream is delivered from an orifice spaced above the blast and also spaced appreciably above the point of delivery or discharge of the secondary jet. Preferably the glass discharge orifice is so located as to deliver a stream of glass which by freefall under the action of gravity will follow a path which would intersect the axis of the jet at a point appreciably above the upper boundary of the blast and thus also above the zone of interaction. As the glass stream approaches the jet, it is influenced by the currents of induced air and is thereby caused to deflect toward the jet above the point where the glass stream would otherwise have intersected the axis of the jet. The induction effect causes the stream of glass to approach the jet and, depending upon the position of the glass orifice, the induction effect will either cause the glass stream to enter the envelope of induced air surrounding the core, or will cause the glass stream to enter the main body of the jet at a point downstream of the jet core. In either case, the glass stream will follow a path leading into the mixing zone and the glass stream will travel within the body of the jet downwardly to the zone of interaction with the blast.

Thus, the glass stream is carried by the induced air currents into the mixing zone of the jet, but does not penetrate the jet core. The glass stream may be carried by the induced air to the surface of the jet core, but will not penetrate the core, which is desirable in order to avoid fragmentation of the glass stream. Since the glass stream is at this time in the influence of the mixing zone of the jet, the stream of glass will be subjected to a preliminary attenuating action and its velocity will increase as the upper boundary of the blast is approached.

In addition to this attenuating action, which is aerodynamic in character, the attenuating stream is subjected to certain other dynamic forces tending to augment the attenuation. This latter attenuation action is caused by the tendency for the attenuated stream to move toward the center of the jet and then be reflected toward the boundary of the jet into the influence of the air being induced. The attenuating stream is then again caused to enter into the interior of the jet. This repeated impulsion supplements the aerodynamic attenuating action.

In the region of interaction with the blast, the partially attenuated stream of glass will be caused to enter the zone of interaction, in part because of the acceleration of the glass resulting from the action of gravity and from the preliminary attenuation described just above, and in part under the influence of the currents established in the zone of interaction itself, in the manner fully explained in our prior applications Ser. No. 557,282 and Ser. No. 353,984, above identified.

Thus it will be seen, that according to the embodiment of the invention shown in FIG. 6, the glass stream is subjected to two successive stages of attenuation. It is also to be observed that since the glass stream is caused to come under the influence of the jet by virtue of the induced currents surrounding the jet, the preliminary attenuation is accomplished without fragmenting the glass stream. Moreover the succeeding or second stage of attenuation which is effected in the zone of interaction between the jet and the blast is also accomplished without fragmenting the fiber being formed. By this two-stage attenuating technique it is thus possible to produce long fibers.

The technique of the present invention has important advantages as compared with various prior techniques. Thus, it provides a technique for the production of long fibers while at the same time making possible greater separation between certain components of the equipment, notably the blast generator or burner, with its nozzle or lips, the jet nozzle and the gas or air supply means associated therewith and the glass supply means including the bushing or similar equipment having glass orifices. This separation of components is not only of advantage from the standpoint of facilitating the structural installation, but is further of advantage because the separation makes possible more convenient and accurate regulation of operating conditions, notably temperature of the blast, jets and glass supply means. Still another advantage of the arrangement according to the present invention, is that the spacing of the glass supply means with its orifices for discharging streams of glass makes possible the utilization of larger glass orifices (which is sometimes desirable for special purposes or materials) because, in the distance of freefall provided for the glass streams, such streams decrease in diameter under the influence of the gravitational acceleration. The streams should of course be of relatively small diameter at the time of initiation of attenuation, and the desired small diameter can readily be achieved, because of the distance of free-fall, notwithstanding the employment of delivery orifices of relatively large size.

The foregoing has still another advantageous feature, namely the fact that a higher temperature may be utilized in the glass bushing or other supply means, thereby enabling use of attenuable materials at higher temperatures, because during the distance of freefall of the glass stream, the stream is somewhat cooled because of contact with the surrounding air, thereby bringing the stream down to an appropriate temperature for the initiation of attenuation.

Because of various of the foregoing factors, the system of this embodiment of the present invention facilitates the use of certain types of molten materials in the making of fibers, for instance slag or certain special glass formulations which do not readily maintain uniformity of flow through discharge orifices of small size. However, since both larger diameter discharge orifices and higher temperatures may be used in the supply of the molten material, it becomes feasible to establish uniformity of feed and attenuation even with certain classes of attenuable materials which could not otherwise be employed in a technique based upon production of fibers by attenuation of a stream of molten material.

In FIG. 6, the glass supply means includes a crucible or bushing 1 which may be supplied with molten glass in any of a variety of ways, for instance by means of a forehearth. Glass supply orifices 3 deliver streams of molten glass downwardly under the action of gravity as indicated at S.

A gaseous blast is discharged in a generally horizontal direction from the discharge nozzle 4, the blast being indicated by the arrow 5. The blast may originate in a generator, usually comprising a burner, so that the blast consists of the products of combustion, with or without supplemental air.

As will be seen from the drawings, the blast is directed generally horizontally below the orifices 3 from which the glass streams S are discharged.

At an elevation intermediate the crucible and the blast discharge device 4, jet tubes 6 are provided, each having a discharge orifice 7, the jet tubes receiving gas from the manifold 8 which in turn may be supplied through the connection fragmentarily indicated at 9.

The gases for delivery to and through the jet tubes 6 may originate in a gas generator taking the form of a burner and the products of combustion may serve for the jet, either with or without supplemental air. Preferably the combustion gases are diluted with air so as to avoid excessively high temperature of the gas delivered through the jet tubes. Alternatively, the jet gas may be derived from a compressor and may be used at a lower temperature, for instance ambient or room temperature.

Each jet tube 6 and its orifice 7 is arranged to discharge a gaseous jet downwardly at a point closely adjacent to the feed path of one of the glass streams S and preferably at the side of the stream S which, with respect to the direction of flow of the blast 5, is upstream of the glass stream. Moreover, each jet tube 6 and its orifice 7 is arranged to dischargr the jet in a path directed downwardly toward the blast and which is inclined to the vertical and so that the projection of the paths of the glass stream and the jet intersect at a point spaced above the upper boundary of the blast 5.

It is contemplated that the vertical dimension of the blast and also the width thereof be considerably greater than the cross sectional dimensions of each secondary jet, so that adequate volume of the blast will be available for each jet to develop a zone of interaction with the blast. For this purpose also, it is further contemplated that the kinetic energy of the jet in relation to that of the blast, in the operational zone of the jet and blast, should be sufficiently high so that the jet will penetrate the blast. As pointed out in our applications Ser. No. 557,282 and Ser. No. 353,984, this requires that the kinetic energy be substantially higher than that of the blast, per unit of volume. Still further, the jet preferably has a velocity considerably in excess of the velocity of the glass stream as fed under the action of gravity downwardly toward the point of contact with the jet, but the jet velocity may either be lower than or in excess of the velocity of the blast.

The operation of each fiberizing center is as follows:

From FIG. 6, it will be seen that the core C of the jet causes the induction of currents of air indicated by the lines A, the amount of air so induced progressively increased along the path of the jet. When the body of the jet, i.e. the gas of the core intermixed with the induced air, reaches the boundary of the blast, a zone of interaction is established in the region indicated by crosslinking marked I.

As the stream S of molten glass descends and approaches the jet delivered from the orifice 7, the currents of air induced by the action of the jet cause the stream of glass to deflect toward the jet core as indicated at S'. Although the glass orifice 3 may be of substantially larger diameter or cross section than the jet orifice 7, the gravity feed of the glass stream S results in substantial reduction in diameter of the glass stream, so that when the stream meets the jet, the diameter of the stream is much smaller than the diameter of the glass orifice. With the higher velocity of the jet, as compared with that of glass stream, even when the glass stream meets the jet in the upstream region adjacent the jet core, the glass stream will not penetrate the jet core. However, because of the induced air currents surrounding the jet, the glass stream is caused to "ride" on the surface of the jet core within the surrounding sheath of induced air or to enter the body of the jet downstream of the jet core.

The action of the induced air in bringing the glass stream to the jet stabilizes the feed of the glass stream and will also assist in compensating for minor misalignment of the glass orifice with respect to the jet orifice. Because of the reliance upon induction effects of an isolated jet, the glass stream is brought into the mixing zone of the gas originating in the jet core and the induced air without subdivision or breakage of the stream or the fiber being formed. This action is enhanced by virtue of the fact that in the arrangement as above described and illustrated, the glass stream is not subjected to any sharp angled change in its path of movement before it has been subjected to some appreciable attenuation, thereby reducing its diameter and inertia.

In consequence of the glass stream being carried in the mixing zone of the jet, the glass stream is partially attenuated, this action representing the first stage of the two-stage attenuation above referred to. In turn, in consequence of this partial attenuation, the length of the embryonic fiber is increased, and this increase in length is accommodated by an undulating or whipping action, thereby forming loops, as indicated at 12. It is to be noted, however, that the glass stream remains intact, the loops of the embryonic fiber being carried downwardly in the mixing zone.

At the point where the blast 5 intercepts the jet, the jet penetrates the blast. This penetration of the blast by the jet establishes currents in the zone of interaction of the jet with the blast, which currents carry the partially attenuated glass stream into the interior of the blast and in consequence a second stage of attenuation occurs. This results in further increase in the length of the fiber being formed. The increase in fiber length is accommodated by additional undulating or whipping action, forming further enlarged loops as indicated at 13 within the blast. Notwithstanding this action, a typical fiber will remain intact and will be carried away by the blast flow in the form of a fiber of considerable length. Thus a single stream of molten glass is converted into a single glass fiber by a two-stage attenuation operation. It will be understood that in effecting this two-stage attenuation, the temperature of the glass and the temperature of the jet, as well as the temperature of the blast, are established at values which will retain the glass in attenuable condition throughout the first stage of attenuation and throughout the second stage until the attenuation has been completed in the zone of interaction between the jet and the blast.

In connection with the arrangement of FIG. 6, it is to be understood that fiberizing centers may be arranged in multiple, transversely of the blast.

The disclosure of the above identified applications Ser. No. 557,282 and Ser. No. 353,984, may be referred to for further information in connection with the general arrangements providing for accommodation of multiple fiberizing centers and also for numerous other features, such, for example, as fiber collection means, glass feed systems and blast and jet generating and delivery systems, and including also information concerning various parameters involved in establishing a zone of interaction of a jet and blast.

In connection with various dimensional relationships involved in the equipment of FIG. 6, reference may be made to our application Ser. No. 676,755.

Figure 7:
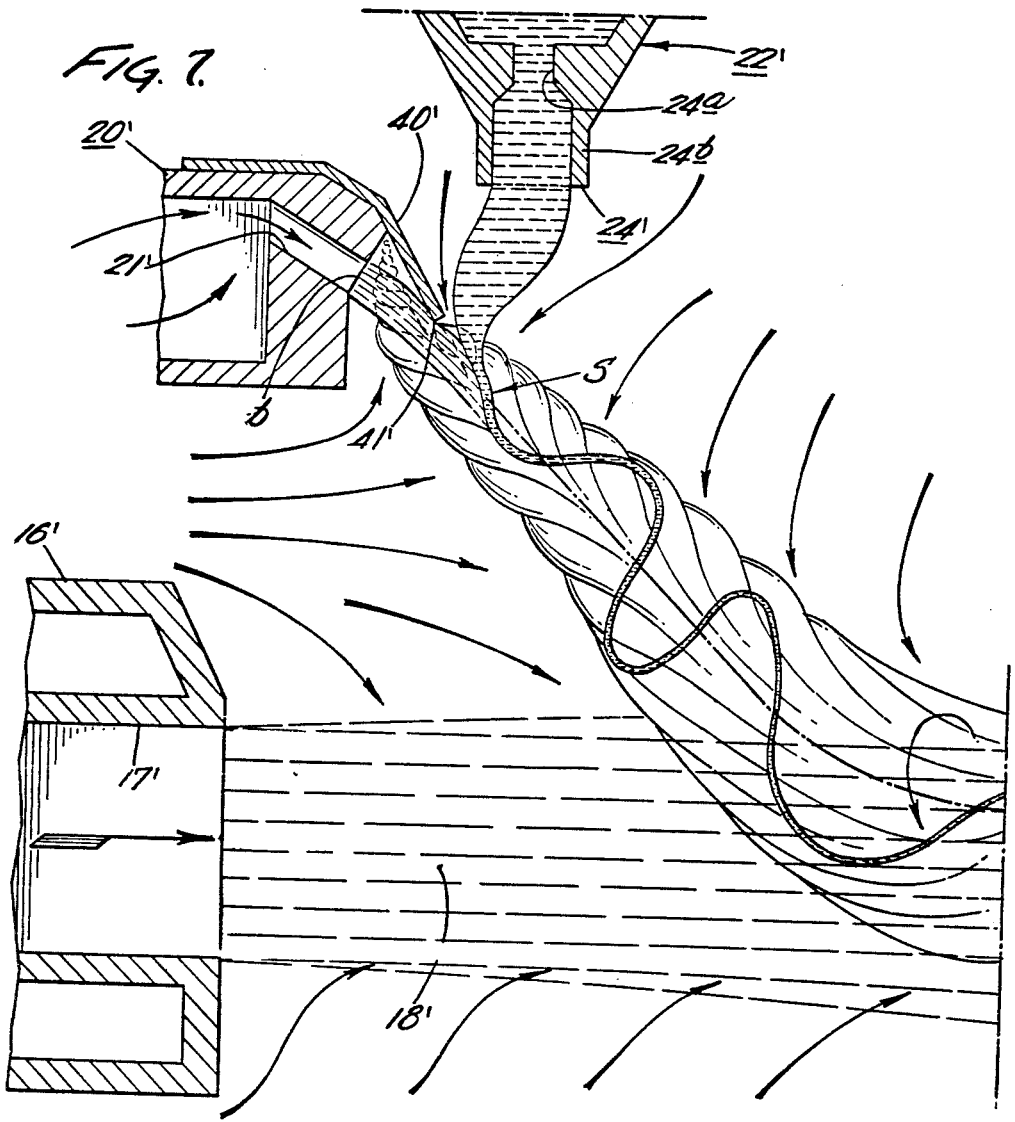
FIG. 7 is a sectional fragmentary view illustrating an embodiment in which both the glass supply means and the jet generators are spaced from each other and in which provision is made for deflection of the jets.
Figure 8:
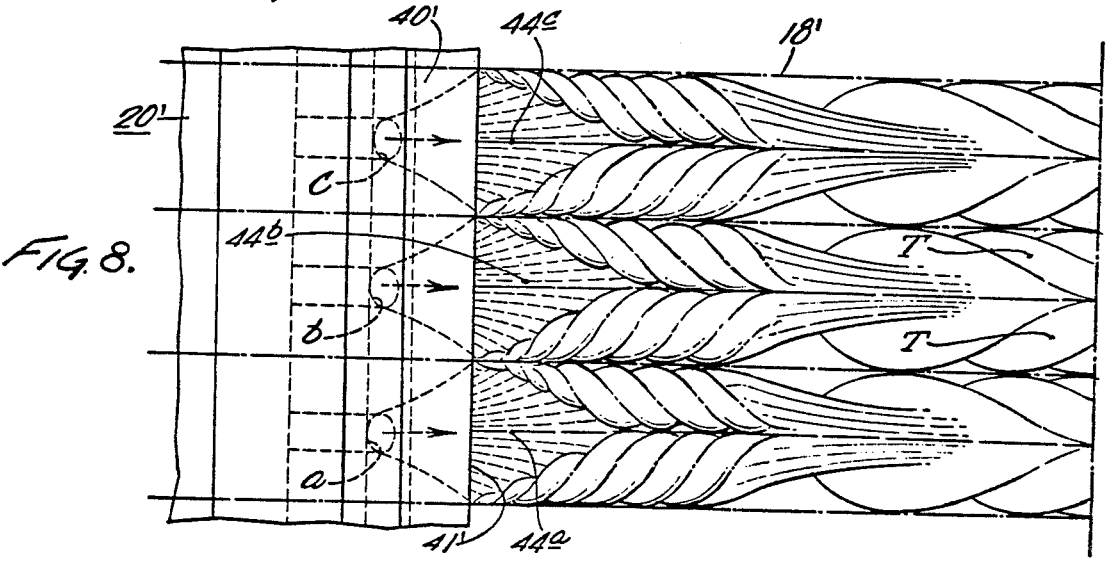
FIG. 8 is a plan view of several jets and of portions of the blast shown in FIG. 7, but omitting the glass feed and glass fibers being formed.

FIGS. 7 and 8

These figures illustrate an embodiment of the invention in which, as in all of the other embodiments illustrated, a toration or interaction zone is established by penetration of a jet into a blast, the fiber being attenuated in said zone by the action of the pair of tornadoes therein. The embodiment of FIGS. 7 and 8 also has in common with the embodiments of FIG. 5, a separation of the glass admission means from the blast.

Still further the embodiment of FIGS. 7 and 8 has in common with the embodiment of FIG. 6, the mutual separation of both the glass admission means and the jet generator from the blast as well as the arrangement of the components to provide for delivery of the glass initially to the jet to be carried thereby into the zone of interaction of the jet with the blast thereby providing a first stage of attenuation of the glass in the jet and a second stage of attenuation in the toration zone resulting from penetration of the jet into the blast.

The arrangement of FIGS. 7 and 8 however has distinctive features including provision for development of a pair of counterrotating tornadoes in the flow of the jet, with a zone of substantially laminar flow between the tornadoes, the glass or other attenuable material being delivered to the zone of laminar flow. This embodiment also provides for deflection or guiding of the jet from one path into another path, the latter being directed toward the blast.

In connection with the drawings, reference is first made to FIG. 7 which shows an exemplary arrangement of equipment. Toward the left in FIG. 7 there is shown a nozzle 16' with a discharge aperture 17' of substantial width so as to deliver a blast 18' with which a plurality of fiberizing centers may be associated. A supply line for a gaseous fluid under pressure is connected to jet manifold box 20' which cooperates in supplying the jet fluid to and through jet orifices, one of which appears at 21'.

A bushing 22' associated with a forehearth or other appropriate glass supply means is provided with glass orifice means indicated at 24', and the stream of glass is delivered into the flow of the jet to be described hereinafter and is carried downwardly to the zone of interaction in the blast 18'. Each of the delivery devices 24' has a metering orifice 24a and preferably also an elongated reservoir or cup downstream of the metering orifice as indicated at 24b.

For the purpose of developing the counter-rotating pairs of tornadoes, the present invention contemplates the utilization of a guiding means, advantageously a common deflector plate 40' associated with a group of the jet orifices. The jets may be subdivided into groups, and each group associated with a manifold box such as indicated at 20', each such box desirably carrying a deflector plate 40'. The guide or deflector plate is desirably formed as a bent plate, one portion of which overlies and is secured to the jet manifold box and the other portion of which has a free edge 41' lying in a position in the path of flow or core of the jets delivered from the jet orifices 21', advantageously along a line intersecting the axes of the jet orifices.

The position of the deflector plate 40' and its edge 41' results in impingement of each of the jets upon the underside of the plate 40' with consequent spreading of the jets. Thus, in FIG. 8, the flow of three of the jets originating from orifices a, b, and c is shown, and it will be seen that as the edge 41' of the plate is approached, each of the jets spreads laterally.

It is contemplated according to the invention that the jet orifices 21' be placed sufficiently close to each other and also that the deflector or guiding means be arranged so that upon lateral spreading, the adjacent or adjoining jets will impinge upon each other in the region of the edge 41' of the deflector plate. Preferably, the adjacent jets impinge upon each other at or close to the free edge 41' of the guide plate 40'. This results in the generation of pairs of counterrotating whirls or tornadoes which are indicated in FIG. 8 in association with each of the three jets delivered from the orifices a, b and c.

Because of the spacing of the apices or points of generation of the tornadoes and because of the progressive enlargement of those tornadoes, generally triangular zones 44a, 44b and 44c intervene between the tornadoes and the edge 41' of the deflector plate, and these triangular zones are of relatively low pressure and are subjected to extensive inflow of induced air, but the flow in these zones is substantially laminar. These are the zones into which the streams of molten glass or other attenuable material are introduced into the system, and because of the character of the triangular laminar zones, each stream of glass is not fragmented but is advanced as a single attenuating stream into the region between the pair of tornadoes.

Because of the introduction of the stream of attenuable material, which is indicated in FIG. 7 at S, into the laminar flow low pressure area between the tornadoes, an accurate and stable feed of the attenuable material is achieved. This carries the stream into the zone of high velocity lying between the pairs of tornadoes and, in consequence, the stream is attenuated as is shown in FIG. 7. The action of the pairs of tornadoes causes a whipping of the attenuated fiber substantially within a planar zone so that this attenuation does not result in projection of the fibers being formed laterally toward the adjoining jets.

Further jet flow causes the jet, together with the attenuating fiber carried thereby, to penetrate the upper boundary of the blast 18', the jet flow still retaining sufficient kinetic energy to effect such penetration of the blast, and thereby initiate a second phase of fiberization which proceeds or is effected, in accordance with the principles fully explained above. Indeed, in the region of penetration of the jets into the blast, the flow and velocity of each jet is still sufficiently concentrated near the center of each jet so that each jet acts individually to develop a zone of interaction in the blast. Thus, from FIG. 8 it will be noted that in the zone of interaction, i.e. in the toration zone, a pair of oppositely rotating whirls or tornadoes indicated at TT, are generated, thereby developing the currents which cause further attenuation of the fiber being formed. The fiber is thereafter carried by the combined flow of the jet and blast to a suitable collection means, for instance a travelling perforated conveyor.

As will be understood, both in the laminar zone adjacent to the edge of the deflector and also as the jet flow progresses downstream, air is induced, and this induction of air is clearly indicated by arrows applied to the jet flow in FIG. 7.

FIGS. 9-16

In all of the predecessor applications above referred to, there are disclosed toration techniques, i.e., techniques for fiberization of attenuable material by delivering a stream of the attenuable material in attenuable condition into the zone of interaction of a gaseous jet directed into a larger gaseous blast. All of the applications also identify various attenuable materials which may be fiberized according to the techniques disclosed; and it is pointed out that the techniques are particularly adapted to the fiberization of thermoplastic materials, especially thermoplastic mineral materials, such as glass, and reference hereinafter will frequently be made to the fiberization of glass, it being understood that other attenuable materials, especially thermoplastic attenuable materials, may be similarly fiberized.

Certain of the above prior applications also disclose arrangements providing for development of a zone of stable or laminar flow in the jet characterized by inflow of induced ambient gas (for instance air), the stream of softened or molten attenuable material being delivered into the influence of the jet in the region of the induced ambient gas entering the zone of laminar flow. In this way, the entry of the stream of attenuable material into the fiberizing center is stabilized, and the stream of material is carried in the jet flow into the zone of interaction with the blast. For this purpose, our prior application Ser. No. 926,954, discloses the use of a jet guiding element introduced into the flow of the jet and having a curved surface operating as a Coanda guiding device, and which develops the desired laminar flow or stable low pressure zone in the jet into which the stream of glass is introduced. Similarly, our prior application Ser. No. 917,480 discloses a deflector plate for the same general purpose.

It will thus be seen that the prior applications Ser. Nos. 926,954 and 917,480 utilize a guiding or deflecting element along the path of the secondary jet between the jet orifice and the boundary of the blast. All of the arrangements of the prior applications just referred to involve some deflection of the flow of the jet, at least in a localized zone of the jet flow. All of those arrangements also result in increased stabilization of the jet flow and of the stream of glass delivered into the influence of the jet. In those prior arrangements, moreover, the stable or laminar flow zone is developed in the jet flow at least in large part in consequence of development of pairs of counter-rotating miniature tornadoes as a result of the jet deflection.

In contrast with the foregoing, the arrangement of the present invention provides increased stability of glass feed and of jet flow without development of the pairs of counter-rotating tornadoes which are characteristic of the arrangements disclosed in applications Ser. Nos. 926,954 and 917,480. This is accomplished in accordance with the present invention by the utilization of a shielding element preferably extended rectilinearly along at least a portion of the jet path between the jet orifice and the boundary of the blast, so as to shield one side of the jet from induced air, while leaving the other side exposed for inflow of induced air. The stream of attenuable material, such as glass, is then introduced into the region of induced air at the unshielded side of the jet flow.

By shielding one side of the jet from induced air, the flow of the jet is stabilized along the surface of the shielding element, and in addition, the glass feed is stabilized by virtue of the glass stream being entrained in the inflow of induced air at the opposite side of the jet, and being carried thereby into the jet flow. It is contemplated that the three major components of the fiberizing center (the blast, the jet and the glass supply) be relatively positioned so that the induced air acting upon the glass stream will cause the glass stream to enter the jet flow either at a point spaced from the penetration of the jet into the blast, or substantially at the point of penetration, i.e., the region of the zone of toration.

Although in the practice of the present invention a series of jets employed in a series of side-by-side fiberizing centers may be positioned sufficiently close to each other to set up some whirling currents or tornadoes, this is not necessary to the practice of the present invention because the shielding element extended along one side of each jet prevents inflow of induced air at that side and provides a "surface" effect tending to stabilize the jet flow, without the necessity for development of pairs of counter-rotating tornadoes.

Figure 9:
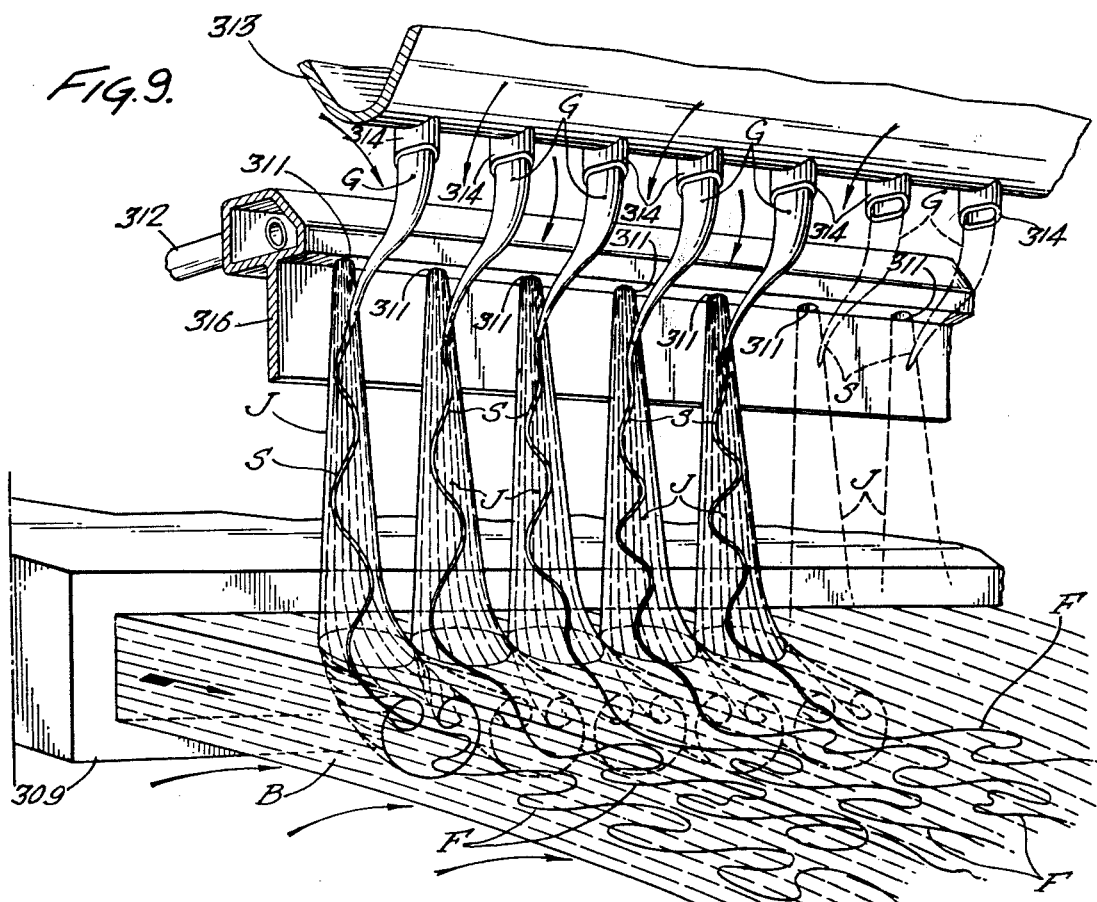
FIG. 9 is a somewhat diagrammatic prespective view of another embodiment of the invention showing a blast with which a series of side-by-side fiberizing centers are associated, each center including a jet and a glass supply stream.

Referring first to the embodiment shown in FIGS. 9 and 10, a blast delivery nozzle 309 is indicated as delivering a blast B, appropriately products of combustion from a fuel burning chamber (not shown), this blast being of sufficient width to provide for cooperation with a series of jets, thereby providing for development of a series of zones of interaction of fiberizing centers in the regions where the jets penetrate into the blast.

In a position spaced above the blast, a jet supply manifold 310 is arranged and is provided with a series of orifices 311 in spaced relation above and positioned to direct the jets J downwardly toward the blast so as to penetrate the blast and develop the toration zones or zones of interaction in the blast. The jet manifold 310 may be supplied with appropriate jet fluid, for instance, compressed air by means of one or more supply connections such as indicated at 312.

The supply of attenuable material, for instance, a glass supply may include a bushing 313 having a series of delivery reservoirs 314, each supplied with glass from the bushing through a metering orifice 315 (see FIG. 44). The glass bulbs delivered from the devices 314 are indicated at G, and these glass bulbs supply the glass from which the streams indicated at S are developed, as the glass enters the influence of the air induced by the jet and also enters the influence of the jet flow itself. In this way, each glass stream is carried downwardly by the jet flow and enters the zone of interaction in the blast, with consequent attenuation of the stream to form a fiber such as indicated at F.

From FIGS. 9 and 10, it will be seen that a jet shielding element 316 is provided in the arrangement of FIGS. 9 and 10, this element being in the form of a planar jet shielding device having its upper edge connected with the lower side of the jet manifold 310 immediately adjacent to one side of the jet orifices 311. The shielding element 316 is of sufficient length to lie adjacent to each of the series of jets delivered from the series of orifices 311; and as shown, the device 316 extends rectilinearly along the portion of the jet path immediately adjacent to the jet orifices.

In connection with the operation of the fiberizing centers of the kind illustrated in FIGS. 9 and 10, it is first pointed out that, as with all gaseous jets, each jet has a core C (see FIG. 10) which comprises gas delivered through the orifices 311 and which has a velocity equal to the discharge velocity at the jet orifice. This core is of tapered or generally conical shape, the length of the core being of the order of two to five times the diameter of the jet orifice, depending somewhat upon the velocity of delivery of the jet gas.

As with all gaseous jets, the gas of the core (the gas which is actually delivered through the jet orifices) is very quickly intermixed with induced air, and most of the jet flow J comprises a mixture of the gas delivered through the orifice and the induced air. This action is illustrated in FIG. 10 but is not shown in FIG. 9, for the sake of simplicity of the diagrammatic illustration. Thus, in FIG. 10, many arrows are indicated in positions in the region of the jets and these arrows represent induced air currents or induced flow of air set up as a result of the action of the jet. It will be understood that this inflow of air will occur with any ambient gas, but in a typical installation for the purposes herein referred to, it is expected that the jet will be operating in the ambient air, in view of which the arrows are here assumed to indicate air induction.

By the positioning of the shielding element 316 along one side of the jets in FIGS. 9 and 10, the jets are shielded from induction of air at that side; and in consequence, the air induced at the opposite side has a tendency to maintain the jet flow in contact with the surface of the shield presented toward the jets. This suface effect tends to cause the jets to remain in contact with the wall of the shield, and this may be referred to as a "surface" effect. This effect even influences the projection of the jet core, as will be seen from FIG. 10 in which it appears that the tip of the core C is closer to the adjoining surface of the shielding element 316 than it is to the central axis line of the jet orifice.

Attention is now called to the fact that the glass delivery devices 314 are so situated with respect to the jet orifices and the shield 316 that the currents of air being induced at the open side of the jet act upon the glass bulbs G and assist in drawing streams S of the glass downwardly and laterally into the jet flow in the region in which the jet is shielded at the opposite side. Because of this interpositioning of the components of each fiberizing center, both the jet and the glass stream flow and entry into the jet are substantially stabilized. The shielding device 316 thus prevents stray currents from causing undesirable alteration in the jet flow path or fluttering of the jet.

It will be noted (see particularly FIG. 9) that the foregoing stabilizing effect is achieved without requiring impingement of adjacent jets upon each other; and in view of this, if desired, the fiberizing centers may be quite widely spaced from each other without encountering any tendency toward instability of either the jet flow or of the glass feed. Although the spacing of the jets may be such that they may impinge upon each other to some degree downstream of the shielding element 316, and while this may develop some whirling currents as a result of such impingement, it is contemplated in accordance with the practice of the present invention that the feed of the glass streams into the influence of the jets be arranged to occur in the stable region of the jet lying along the shielding surface of the shielding element 316.

The stream of glass entering the influence of each jet will be subjected to some preliminary attenuation in the jet flow itself; but in addition, it is contemplated that the primary attenuation of the glass stream will occur in the zone of interaction of the jet in the blast, i.e., the toration zone which is more fully explained in the applications above identified and particularly in our prior applications Ser. Nos. 557,282 (now U.S. Pat. No. 4,015,964) and 353,984 (now U.S. Pat. No. 3,885,940).

It is here again pointed out that for the purpose of establishing toration zones, the jet should have a smaller cross-sectional dimension than that of the blast, preferably a smaller cross-sectional area, and should further have kinetic energy per unit of volume which is greater than that of the blast, thereby providing for penetration of the jet into the blast.

As shown in FIGS. 9 and 10, the blast is delivered generally horizontally and the jets are delivered generally vertically downwardly into the blast, the glass streams being delivered by gravity in a position laterally offset from the jets. This exact relationship need not necessarily be employed, and the blast and jet may be directed in paths somewhat differently oriented; but it is preferred that the blast and jet be arranged to cooperate with glass streams in the manner described above, where the glass streams are drawn from glass supply bulbs delivered by gravity from the supply devices.

It will be noted that in the embodiment just described (and also in the embodiments described hereinafter), each jet comes in contact with a shielding element in the path of the jet between the jet discharge orifice and the blast. As above mentioned, it is also necessary that each jet should have kinetic energy per unit of volume higher than that of the blast.

While such kinetic energy may be provided with a jet of high temperature and high velocity, high temperature and high velocity detrimentally affect the jet shielding elements and result in erosion and undesirable thermal expansion and contraction of such elements. It is therefore preferred to employ jets of relatively low temperature and velocity. The lower temperature and velocity still provide the required kinetic energy ratio between the jet and blast, i.e., a jet having kinetic energy per unit of volume higher than that of the blast so that the jet will penetrate the blast and create a zone of interaction. The reason why this desired kinetic energy ratio is still present with the lower velocity of the jet is because of the higher density of the jet fluid at the lower temperature. The density, of course, increases with decrease of temperature and since the kinetic energy is determined not by the velocity alone but also by the density of the jet fluid, a jet may readily be provided having a higher kinetic energy per unit of volume than the blast, even at velocities lower than the velocity of the blast.

By use of a jet at ambient temperature, it becomes feasible to employ a commonly available source of compressed air as the source of fluid for the jet. However, the jet temperature need not necessarily be as low as ambient or room temperature. Preferably the jet temperature is well below the softening point of the thermoplastic material being attenuated, and in the case of attenuation of glass or similar mineral materials, the jet temperature is preferably selected at a value below 200° C., and most desirably below 100° C.

As indicated above, the desired kinetic energy of the jet may be obtained while still utilizing a jet velocity even below the velocity of the blast. In a typical case with blast velocities of the order of 200 m/sec to 800 m/sec, which is a suitable range in the fiberization of various thermoplastic mineral materials such as glass, the jet velocity may even be substantially lower than the blast velocity.

With a blast comprising products of combustion at a temperature above about 1000° C. and a velocity in the range from about 250 m/sec to 800 m/sec, and with a jet comprising air (or a gas of similar density) at a temperature below about 100° C., the desired predominance of kinetic energy of the jet over the blast can be attained by employment of a jet velocity less than about that of the blast, for instance in the range of from about 200 m/sec to about 400 m/sec. It will be understood that the jet velocities referred to are related to the jet velocity at a point downstream of the jet shielding element, as the jet approaches the blast.

Figure 14:
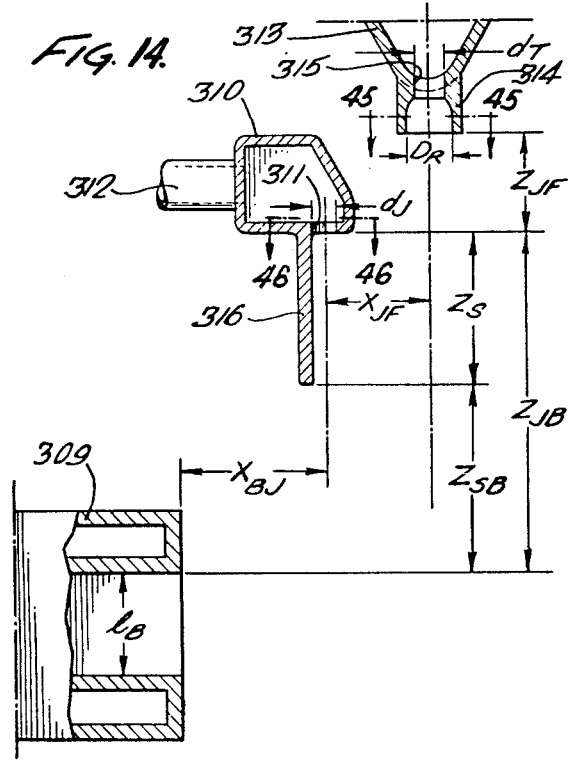
FIG. 14 is a vertical sectional view through the components of a fiberizing system of the general kind shown in FIGS. 9 and 10, with dimensional relationships indicated.
Figure 15:
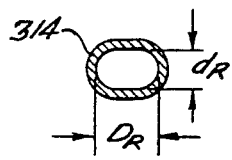
FIG. 15 is a horizontal sectional view taken as indicated by the line 15—15 on FIG. 14 and illustrating the shape of a glass supply device.
Figure 16:
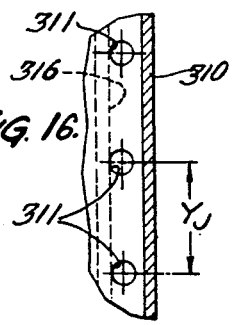
FIG. 16 is a fragmentary sectional view, taken on the section line 16—16 on FIG. 14 indicating spacing interrelationship between adjacent fiberizing centers in a series such as shown in FIG. 9.

Attention is now directed to the diagrams of FIGS. 14, 15 and 16 which give certain dimensional relationships and ranges thereof.

Thus, reference is first made to the bushing 313 for the supply of the attenuable material, in connection with which see Table I just below.

TABLE I

| Symbol | (mm) Preferred Value | Range | |
|---|---|---|---|
| $d_T/d_J$ | 1.5 | 0.5 | 2.5 |
| $d_R/d_J$ | 1 | 0.5 | 2.5 |
| $D_R/d_J$ | 2.5 | 0.5 | 5 |

With reference to the jet supply and the shielding element 316, see the following table:

TABLE II

| Symbol | (mm) Preferred Value | Range | |
|---|---|---|---|
| $d_J$ | 1.5 | 0.5 | 4 |
| $Y_J/d_J$ | 2.5 | 1.5 | |
| $Z_S/d_J$ | 2.5 | 1 | 10 |

With regard to the blast, note the following table:

TABLE III

| Symbol | (mm) Preferred Value | Range | |
|---|---|---|---|
| $l_B/d_J$ | 5 | 2.5 | 10 |

In addition to the foregoing dimensions involved in the three major components of the system, certain inter-relationships of those components are also to be noted, being given in the table just below.

TABLE IV

| Symbol | (mm) Preferred Value | Range | |
|---|---|---|---|
| $Z_{JF}/d_J$ | 0.5 | 0 | 2.5 |
| $Z_{JB}/d_J$ | 8.5 | See range for $Z_S$ and $Z_{SB}$ | |
| $Z_{SB}/d_J$ | 6 | 0 | 12 |
| $X_{BJ}/d_J$ | −2.5 | −7.5 | +2.5 |
| $X_{JF}/d_J$ | 2.5 | 1.5 | 4 |

In connection with the symbol $X_{BJ}$, it is noted that in the illustration of FIG. 14, $X_{BJ}$, is indicated at a negative value.

In connection with the means for delivering a stream of the attenuable material, it is to be understood that either an isolated orifice, a slot associated with a row of jets, or a series of orifices situated, for example, at the end of glass delivery devices may be used. When a slot is used it is situated transversely of the blast and the material coming from the slot is divided into a series of cones and strands by the action of the air induced by the secondary jets themselves, for instance in the manner disclosed in our U.S. Pat. No. 3,885,940 above referred to.

Attention is now directed to the alternative form of the equipment shown in FIG. 11. Actually, the individual components shown in FIG. 11 are identical with those of FIGS. 9 and 10, but FIGS. 11 illustrates a slightly different interrelation or interpositioning of certain of the components of the fiberizing center. One of the chief differences illustrated in FIG. 11 is the positioning of the jet supply manifold and of the shielding element 316 much closer to the blast, than in FIGS. 9 and 10. Indeed, in FIG. 11, the jet manifold 310 and the shielding element 316 have been brought down to the point where the shielding element extends substantially throughout the entire distance from the jet orifices to the boundary of the blast. At the same time, in FIG. 11, the glass supply means, including delivery devices 314, are also brought down closer to the blast. In addition, the relative positions of the jet manifold 310 and of the glass supply means is also changed in FIG. 11, each of the glass supply devices 314 being brought down to the point where the air induced at the unshielded side of the jet causes the stream S of the glass to enter the influence of the jet substantially at the boundary of the blast. In FIG. 11, therefore, the glass stream substantially directly enters the zone of interaction between the jet and the blast, in view of which the arrangement of FIG. 11 differs from the arrangement of FIGS. 9 and 10 in that no appreciable attenuation of the glass stream occurs in the jet flow prior to entry of the stream into the zone of interaction in the blast.

Since in the arrangement of FIG. 11 the jet is shielded substantially throughout its entire path from the jet orifice to the blast, there is in effect no substantial zone of the jet flow which is unshielded. Adverse influences of stray currents is thus virtually eliminated in the embodiment of FIG. 11.

In the embodiment of FIGS. 12 and 13, the relationship of the components is essentially the same as in FIG. 11, but in FIG. 12, instead of employing a planar shielding element such as the element 316 of FIGS. 9, 10 and 11, the embodiment of FIG. 12 utilizes separate individual tubular jet shielding devices 316a (shown also in perspective in FIG. 13). In this arrangement, it is contemplated that a separate tubular shielding device 316a be associated with each jet orifice. As clearly shown in FIGS. 12 and 13, each of these devices 316a comprises a piece of a tube with one side of its lower end cut away. This device thus provides a shield in the form of a channelshaped element embracing the jet, thereby completely shielding about one-half of the circumference of the jet. The glass delivery means is arranged to deliver the glass bulb G in a region laterally offset from the open side of the shielding channel for the jet, so that the glass stream S will be drawn into the jet flow by the induced air. An arrangement such as shown in FIGS. 12 and 13 may be employed with greater spacing between the jet and shielding elements and the blast, for instance, spacing of the order of magnitude contemplated in accordance with FIGS. 9 and 10; and in this event, the glass supply means may also be separated from the blast, for instance, to the general extent indicated by FIGS. 9 and 10.

Appropriate values for the pressure, temperature, velocity and kinetic energy of the jet and blast are indicated below, as well as the kinetic energy ratio of the jet to the blast.

| JET | | |
|---|---|---|
| Symbol | Preferred Value | Range |
| $P_J$ (bar) | 4.5 | 1  50 |
| $T_J$ (°C.) | 20 |   1500 |
| $V_J$ (m/sec) | 330 | 200  900 |
| $P_J V_J^2$ (bar) | 3.9 | 0.8  45 |

| BLAST | | |
|---|---|---|
| Symbol | Preferred Value | Range |
| $P_B$ (bar) | 0.150 | 0.050  0.500 |
| $T_B$ (°C.) | 1550 | 1300  1800 |
| $V_B$ (m/sec) | 400 | 200  800 |
| $P_B V_B^2$ (bar) | 0.3 | 0.1  1 |

| KINETIC ENERGY | | |
|---|---|---|
| Symbol | Preferred Value | Range |
| $P_J V_J^2$ | 13 | 0.8  450 |
| $P_B V_B^2$ | | |

An appropriate glass temperature is 145° C.; and the pull or production rate from each glass orifice may be from about 20 to about 150 kg/day, for instance 75 kg/day.

We claim:

1. A method for making fibers from attenuable material, comprising generating a gaseous blast, generating a gaseous jet directed in a path toward the blast, the jet being generated in a region spaced laterally from the blast thereby inducing ambient gas into the jet flow in the space between said region and the blast, preventing induction of ambient gas at one side of the jet by shielding that side with a shielding element having a shielding surface which is extended substantially rectilinearly along the path of the jet in a zone intermediate the blast and the region of generation of the jet, the jet flow downstream of the shielded zone being of cross-sectional dimension smaller than the blast and having kinetic energy per unit of volume higher than that of the blast and the jet penetrating the blast and thereby creating a zone of interaction with the blast, and delivering a stream of attenuable material in attenuable condition into the influence of the ambient gas being induced by the jet toward the side thereof opposite to the shielded side thereby providing for delivery of the stream of attenuable material into the zone of interaction of the jet with the blast.

2. A method as defined in claim 1 in which the jet is shielded to prevent induction of ambient gas at the side of the jet which, with respect to the direction of flow of the blast, is upstream of the blast.

3. A method as defined in claim 1 in which the stream of attenuable material is delivered into the influence of the ambient gas being induced by the jet in a region spaced sufficiently from the blast to provide for induction of the stream along with the ambient gas into the jet upstream of the penetration of the jet into the blast.

4. A method as defined in claim 1 in which the stream of attenuable material is delivered into the influence of the ambient gas being induced by the jet in a region sufficiently close to the blast to provide for induction of the stream along with the ambient gas substantially directly into the zone of interaction of the jet with the blast.

5. A method as defined in claim 1 in which the jet is directed in a downwardly directed path and in which the stream of attenuable material is gravity fed downwardly in spaced relation to the jet into the influence of the ambient gas induced by the jet.

6. Equipment for making fibers from attenuable material, comprising a blast discharge device, jet generating means developing a gaseous jet having a cross-sectional dimension smaller than the blast and directed in a path transverse to and penetrating the blast, thereby developing a zone of interaction of the jet in the blast, the jet generating means being spaced from the boundary of the blast thereby providing for induction of ambient gas into the jet flow in the space between the blast and the jet generating means, a jet shielding element having a shielding surface extended substantially rectilinearly along one side of the jet in a region intermediate the blast and the jet generating means and acting to prevent substantial induction of ambient gas at said one side of the jet in said region, and means for delivering a stream of attenuable material in attenuable condition into the influence of the induced ambient gas at the other side of the jet, thereby providing for delivery of said stream into the zone of interaction of the jet in the blast.

7. Equipment as defined in claim 6 in which the jet shielding element has a substantially planar shielding surface extended parallel to the jet substantially along one boundary of the jet.

8. Equipment as defined in claim 6 in which the jet shielding element comprises a channel-shaped element embracing the jet.

9. Equipment as defined in claim 6 in which the jet shielding element is positioned at that side of the jet which, with relation to the direction of flow of the blast, is upstream of the blast.

10. Equipment as defined in claim 6 in which the jet generating means comprises a series of side-by-side jet discharge orifices positioned to direct a plurality of side-by-side jets in paths transverse to the blast, in which a means for delivering a stream of the attenuable material is associated with each jet, and in which a jet shielding element is provided having a shielding surface common to the series of jets.

11. Equipment as defined in claim 6 in which the jet generating means comprises a series of side-by-side jet discharge orifices positioned to direct a plurality of side-by-side jets in paths transverse to the blast, in which a means for delivering a stream of the attenuable material is associated with each jet, and in which a separate channel-shaped shielding element is provided for each jet, with the channel of each element embracing its respective jet.

12. Equipment as defined in claim 10 in which the jets of the series are spaced from each other sufficiently to avoid substantial impingement of the jets upon each other in the region in which the streams of attenuable material are delivered into the influence of the induced ambient gas.

13. Equipment as defined in claim 6 in which the jet generating means is positioned to deliver the jet downwardly and in which the material delivery means is arranged for downward gravity delivery of the stream in a position laterally offset from the jet but in the region of induction of ambient gas by the jet.

14. Equipment for making fibers from attenuable material, comprising a blast discharge device, jet generating means developing a gaseous jet having a cross-sectional dimension smaller than the blast and directed in a path transverse to and penetrating the blast, thereby developing a zone of interaction of the jet in the blast, the jet generating means being spaced from the boundary of the blast thereby providing for induction of ambient gas into the jet flow in the space between the blast and the jet generating means, a jet shielding element having a jet shielding surface extending along one side of the jet substantially from the jet generating means to the boundary of the blast to prevent substantial induction of ambient gas at said one side of the jet, and means for delivering a stream of attenuable material in attenuable condition into the influence of the induced ambient gas at the other side of the jet, thereby providing for delivery of said stream into the zone of interaction of the jet in the blast.

15. Equipment as defined in claim 14 in which the jet shielding element comprises a channel-shaped device embracing the jet.

16. Equipment as defined in claim 14 in which the jet generating means comprises a series of side-by-side jet discharge orifices positioned to direct a plurality of side-by-side jets in paths transverse to the blast, in which a means for delivering a stream of the attenuable material is associated with each jet, and in which a jet shielding element is provided having a shielding surface common to the series of jets.

* * * * *